US010698712B2

(12) United States Patent
Reddy et al.

(10) Patent No.: US 10,698,712 B2
(45) Date of Patent: *Jun. 30, 2020

(54) METHODS AND APPARATUS TO MANAGE VIRTUAL MACHINES

(71) Applicant: VMware, Inc., Palo Alto, CA (US)

(72) Inventors: Thirumalesh Reddy, San Jose, CA (US); Sreekantha Indireddy, Cupertino, CA (US); Shreekanth Ankala, Dublin, CA (US); Bhavin Mathia, Santa Clara, CA (US)

(73) Assignee: VMWARE INC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,385

(22) Filed: Sep. 21, 2016

(65) Prior Publication Data
US 2017/0010913 A1 Jan. 12, 2017

Related U.S. Application Data

(63) Continuation of application No. 14/315,296, filed on Jun. 25, 2014, now Pat. No. 9,465,834.
(Continued)

(51) Int. Cl.
G06F 9/455 (2018.01)
G06F 16/24 (2019.01)
(Continued)

(52) U.S. Cl.
CPC ...... G06F 9/45558 (2013.01); G06F 9/45533 (2013.01); G06F 9/5077 (2013.01);
(Continued)

(58) Field of Classification Search
CPC .... G06F 8/60; G06F 9/44505; G06F 9/45533; G06F 9/45558; G06F 9/5077;
(Continued)

(56) References Cited

U.S. PATENT DOCUMENTS 7,207,041 B2 4/2007 Elson et al.
7,392,524 B2 6/2008 Ault et al.
(Continued)

FOREIGN PATENT DOCUMENTS

CN 102216922 10/2011
CN 103238136 8/2013
EP 2261832 12/2010

OTHER PUBLICATIONS

Open Data Center Alliance, "Open Data Center Alliance Master Usage Model: Service Orchestration Rev 1.0", 2012, Open Data Center Alliance, Inc., retrieved from www.opendatacenteralliance. org/docs/ODCA_Service_Orch_MasterUM_v1.0_Nov2012.pdf, 49 pages.*
(Continued)

Primary Examiner — Ted T. Vo
(74) Attorney, Agent, or Firm — Hanley, Flight & Zimmerman, LLC

(57) ABSTRACT

Methods and apparatus to manage virtual machines are disclosed. An example method includes determining that a deployment of a first virtual machine has halted because the first virtual machine is dependent on a second virtual machine that has not been fully deployed and in response to detecting that the second virtual machine has been deployed, notifying, via a processor, the first virtual machine that deployment of the first virtual machine may continue.

18 Claims, 15 Drawing Sheets

Related U.S. Application Data

(60) Provisional application No. 61/889,971, filed on Oct. 11, 2013.

(51) Int. Cl.
*G06F 9/50* (2006.01)
*G06F 9/445* (2018.01)

(52) U.S. Cl.
CPC .......... *G06F 16/24* (2019.01); *G06F 9/44505* (2013.01); *G06F 2009/4557* (2013.01); *G06F 2009/45595* (2013.01)

(58) Field of Classification Search
CPC ....... G06F 17/30386; G06F 2009/4557; G06F 2009/45595; G06F 16/24
USPC ...................... 717/120–121, 171–172; 718/1
See application file for complete search history.

(56) References Cited

U.S. PATENT DOCUMENTS

| | | | |
|---|---|---|---|
| 7,647,596 B2* | 1/2010 | Cassorla | G06F 9/542 |
| | | | 719/316 |
| 8,132,176 B2 | 3/2012 | Bissett et al. | |
| 8,171,485 B2 | 5/2012 | Muller | |
| 8,176,487 B2 | 5/2012 | Armstrong et al. | |
| 8,230,425 B2 | 7/2012 | Ahuja et al. | |
| 8,346,935 B2 | 1/2013 | Mayo et al. | |
| 8,387,048 B1 | 2/2013 | Grechishkin et al. | |
| 8,387,060 B2 | 2/2013 | Pirzada et al. | |
| 8,448,170 B2 | 5/2013 | Wipfel et al. | |
| 8,458,695 B2 | 6/2013 | Fitzgerald et al. | |
| 8,458,699 B2 | 6/2013 | Dasari et al. | |
| 8,572,611 B2 | 10/2013 | Eide et al. | |
| 8,601,473 B1 | 12/2013 | Aron et al. | |
| 8,850,442 B2 | 9/2014 | Davis et al. | |
| 8,910,156 B1 | 12/2014 | Kenchammana-Hosekote et al. | |
| 8,959,511 B2 | 2/2015 | Sinha et al. | |
| 8,972,980 B2 | 3/2015 | Banga et al. | |
| 9,465,834 B2* | 10/2016 | Reddy | G06F 9/45533 |
| 2013/0185715 A1 | 7/2013 | Dunning et al. | |
| 2013/0232498 A1 | 9/2013 | Mangtani et al. | |

OTHER PUBLICATIONS

Frank Denneman, "vSphere 5.1 Storage DRS Multi-VM provisioning improvement", 2012, retrieved from http://frankdenneman.nl/2012/11/02/vsphere-5-1-storage-drs-multi-vm-provisioning-improvement/ , 5 pages.*

United States Patent and Trademark Office, "Notice of Allowance," issued in connection with U.S. Appl. No. 14/315,300, dated Jan. 11, 2016, 25 pages.

United States Patent and Trademark Office, "Notice of Allowance," issued in connection with U.S. Appl. No. 14/315,297, dated Feb. 12, 2016, 7 pages.

United States Patent and Trademark Office, "Notice of Allowance," issued in connection with U.S. Appl. No. 14/315,299, dated Feb. 12, 2016, 11 pages.

Soror et al., "Automatic Virtual Machine Configuration for Database Workloads," vol. 35, No. 1, Article 7, Feb. 2010, 47 pages.

Park et al., "Fast and Space-Efficient Virtual Machine Checkpointing," School of Computer Science and Engineering, Seoul National University, Seoul 151-744, Korea, Mar. 9-11, 2011, 11 pages.

Nordal et al., "Streaming as a Hypervisor Service," VTDC' 13, Jun. 18, 2013, New York, NY, 8 pages.

Kontoudis et al., "Modeling and Managing Virtual Network Environments," ACM, Sep. 19-21, 2013, 8 pages.

United States Patent and Trademark Office, "Non-Final Office Action." issued in connection with U.S. Appl. No. 14/315,300 dated Aug. 18, 2015, 34 pages.

Janik et al., "Transparent Resource Management and Self-Adaptability Using Multitasking Virtual Machine RM API", Institute of Computer Science, AGH, May 21-22, 2006, pp. 51-57, 7 pages.

Hillbrecht et al, "A SNMP-based Virtual Machines Management Interface," IEEE/ACM Fifth International Conference on Utility and Cloud Computing, 2012, pp. 279-286, 8 pages.

United States Patent and Trademark Office, "Non-Final Office Action." issued in connection with U.S. Appl. No. 14/315,297 dated Aug. 28, 2015, 15 pages.

Open Data Center Alliance, "Open Data Center Alliance Usage Model: Long Distance Workload Migration Rev 1.0", 2012, Open Data Center Alliance, Inc., retrieved from http://www.opendatacenteralliance.org/docs/Long_Distance_Workload_Migration_Rev1.O_b.pdf, 21 pages.

Konstantinou et al., "An Architecture for Virtual Solution Composition and Deployment in Infrastructure Clouds", 2009, ACM, 9 pages.

United States Patent and Trademark Office, "Non-Final Office Action." issued in connection with U.S. Appl. No. 14/315,299 dated Aug. 28, 2015, 13 pages.

Jin, "Virtual Appliance: Is It a Virtual Machine or an Application?", 2010, retrieved from http://www.doublecloud.org/2010/04/virtual-appliance-is-it-a-virtual-machine-or-an-application/, 4 pages.

State Intellectual Property Office of China, "Office Action," issued in connection with application No. 201480066760.0, dated Feb. 15, 2017, 3 pages.

State Intellectual Property Office of China, "Search Report," issued in connection with application No. 201480066760.0, dated Feb. 7, 2017, 3 pages.

European Patent Office, "European Search Report," issued in connection with application No. 14852442.4 dated May 26, 2017, 8 pages.

* cited by examiner

METHODS AND APPARATUS TO MANAGE VIRTUAL MACHINES

RELATED APPLICATION

This patent is a continuation of U.S. patent application Ser. No. 14/315,296, filed Jun. 25, 2014, entitled "METHODS AND APPARATUS TO MANAGE VIRTUAL MACHINES," which claims the benefit of U.S. Provisional Patent Application Ser. No. 61/889,971, filed on Oct. 11, 2013, entitled "METHODS AND APPARATUS TO MANAGE A VIRTUAL CLOUD ENVIRONMENT." U.S. patent application Ser. No. 14/315,296 and U.S. Provisional Patent Application Ser. No. 61/889,971 are hereby incorporated herein by reference in their entirety.

FIELD OF THE DISCLOSURE

This disclosure relates generally to virtual computing, and, more particularly, to methods and apparatus to manage virtual machines.

BACKGROUND

Virtualizing computer systems provides benefits such as the ability to execute multiple computer systems on a single hardware computer, replicating computer systems, scalability, moving computer systems among multiple hardware computers, and so forth. Example systems for virtualizing computer systems and/or managing virtualized computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application Ser. No. 60/919,965, entitled "METHOD AND SYSTEM FOR MANAGING VIRTUAL AND REAL MACHINES," filed Mar. 26, 2007, and U.S. patent application Ser. Nos. 14/105,066, 14/105,069, and 14/105,072, entitled "METHODS AND APPARATUS FOR VIRTUALIZED COMPUTING," filed Dec. 12, 2012, all of which are hereby incorporated herein by reference in their entirety.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

DETAILED DESCRIPTION

Cloud computing platforms provide many powerful capabilities for performing computing operations. However, taking advantage of these computing capabilities manually may be complex and/or require significant training and/or expertise. Methods and apparatus disclosed herein facilitate the management of virtual machine resources in, for example, cloud computing platforms. For example, as disclosed in detail herein, methods and apparatus disclosed herein provide for automation of management tasks such as provisioning multiple virtual machines in parallel for a multiple-machine computing system (e.g., a group of servers that inter-operate), sharing configuration information among virtual machines as they are provisioned, storing configuration information linking virtual machines with their designated workload, and dynamically attaching services to virtual machines based on a selected profile or service level. The improvements to cloud management systems (e.g., the vCloud Automation Center (vCAC) from VMware®), interfaces, portals, etc. disclosed herein may be utilized individually and/or in any combination. For example, all or a subset of the described improvements may be utilized.

Figure 1:
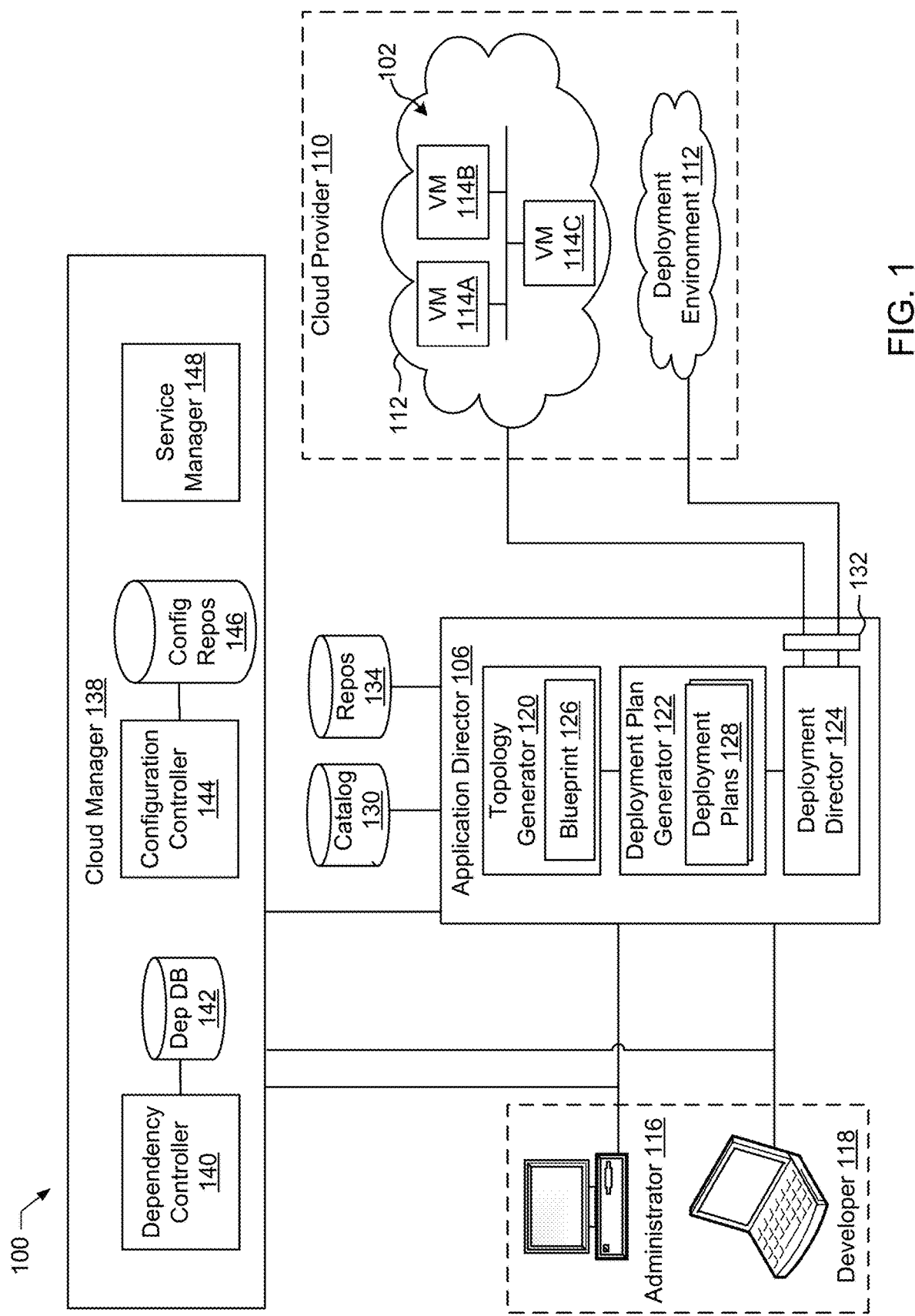
FIG. 1 is an illustration of an example system constructed in accordance with the teachings of this disclosure for managing a cloud computing platform.

FIG. 1 depicts an example system 100 constructed in accordance with the teachings of this disclosure for managing a cloud computing platform. The example system 100 of FIG. 1 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," first virtual machine 114A, second virtual machine 114B, third virtual machine 114C) that may be accessed by users of the cloud computing platform 110 (e.g., users associated with an administrator 116 and/or a developer 118) and/or other programs, software, device, etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center (vCAC) API and a vCloud Director API available from VMware, Inc. The example cloud computing platform provider 110 of FIG. 1 provisions virtual computing resources (e.g., the VMs 114) to provide the deployment environments 112 in which the administrator 116 and/or developer 118 can deploy multi-tier application(s). An example implementation of a deployment environment that may be used to implement the deployment environments 112 of FIG. 1 is vCloud Datacenter cloud computing services available from VMware, Inc.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 of FIG. 1 generally captures the structure of an application as a collection of application components executing (or to be executed) on virtual computing resources. For example, the basic blueprint 126 generated by the example topology generator 120 for an online store application may specify a web application (e.g., in the form of a Java web application archive or "WAR" file comprising dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, comprised of one or more application packages and their dependent middleware and/or operating systems. Applications may be distributed across multiple VMs. Thus, in the example described above, the term "application" refers to the entire online store application, including application server and database components, rather than just a particular web application itself (e.g., a database application). In some instances, the application may include the underlying hardware (e.g., virtual computing hardware) utilized to implement the components.

The example basic blueprint 126 of FIG. 1 may be assembled from items (e.g., templates) from a catalog 130. The example catalog 130 of FIG. 1 is a listing of available virtual computing resources (e.g., VMs, networking, storage) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency to execute the load balancer from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks) and an execution plan of tasks having a specified order in which virtual computing resources are provisioned and application components are installed, configured, and/or started. The deployment plan 128 may be referred to as a "global deployment plan." The example deployment plan 128 of FIG. 1 provides an IT administrator with a process-oriented view of the basic blueprint 126 that indicates discrete actions to be performed to deploy the application. Multiple different deployment plans 128 may be generated from a single basic blueprint 126 to test prototypes (e.g., new application versions), to scale up and/or scale down deployments, and/or to deploy the application to different deployment environments 112 (e.g., testing, staging, production). Once the VMs 114 are created, portions of the deployment plan 128 are separated and distributed to the VMs 114 as a plurality of local deployment plans. Each of the local deployment plans comprises one or more (e.g., a series of) tasks to be executed by one or more of the VMs 114 provisioned from the deployment environment 112. Each VM 114 coordinates execution of its respective task(s) with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 of the illustrated example communicates with a heterogeneous mixture of cloud provider 110 and deployment environments 112. The deployment director 124 of the illustrated example provides each VM 114 with a respective local deployment plan specifying series of tasks specific to the receiving VM 114. Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 of FIG. 1 coordinates with the VMs 114 to execute the tasks in an order that observes installation dependencies (if any) between the VMs 114 according to the global deployment plan 128. After the application has been deployed, the application director 106 of the illustrated example may monitor and/or modify (e.g., scale) the deployment.

The example cloud manager 138 of FIG. 1 interacts with the components of the system 100 (e.g., the application director 106) and/or the environment of use (e.g., the cloud provider 110) to facilitate the management of the resources of the cloud provider 110. In the example of FIG. 1, the cloud manager 138 includes a dependency controller 140, a dependency database 142, a configuration controller 144, a configuration repository 146, and a service manager 148. In some examples, the cloud manager 138 additionally includes other components for managing a cloud environment. In some examples, components of the cloud manager 138 and, more generally, the cloud manager 138 are utilized to manage virtual machine systems that are not associated with a cloud.

When virtual machines are deployed as part of a group (e.g., an e-commerce application comprising a web server virtual machine, a financial virtual machine, and a database virtual machine), the deployment of a first virtual machine may depend upon the deployment of a second virtual machine. For example, if the first virtual machine 114A is a web server virtual machine and the second virtual machine 114B is a database virtual machine, the first virtual machine 114A needs to await information (e.g., network location, authentication parameters, etc.) about the second virtual machine 114B before provisioning can be completed. Accordingly, provisioning of the first virtual machine 114A will be delayed until the second virtual machine is provisioned. The example dependency controller 140 of the illustrated example stores information about the dependency of virtual machine resources in the dependency database 142 and coordinates the provisioning of the resources based on the stored dependency information to facilitate the parallel deployment of dependent virtual machines. In other words, according to this example, the deployment of the first virtual machine and deployment of the second virtual machine may be performed in parallel (e.g., deployment of the first and second virtual machines may be initiated at substantially the same time) and the deployments may be halted as needed to ensure that the second virtual machine is sufficiently deployed by the time that the first virtual machine requires the second virtual machine to exist, be accessible, provide information, etc. (e.g., because the first virtual machine is dependent on the second virtual machine).

According to the foregoing example, the first virtual machine 114A is instrumented with an instruction to await availability of a deployed database (e.g., the second virtual machine 114B in the identified example) by sending a wait request to the dependency controller 140. The dependency controller 140 of the illustrated example stores information about the wait request in the example dependency database 142. The instruction causes the deployment of the first virtual machine 114A to be automatically placed on hold at the point (e.g., just prior to) in the deployment where the database information is needed (or about to be needed). Thus, deployment of the first virtual machine 114A can be started without regard for the status of the deployment of the second virtual machine 114B. For example, the deployment of the first virtual machine 114A can be started at the same time as the deployment of the second virtual machine 114B, can be started prior to the deployment of the second virtual machine 114B, etc. Accordingly, when deployment of the first virtual machine 114A and deployment of the second virtual machine 114B are handled by different persons, these persons do not need to coordinate the start of deployment. Additionally, regardless of how many persons are involved in the deployment of the virtual machines under the global deployment plan, by starting deployment of the first virtual machine 114A prior to completion of the deployment of the second virtual machine 114B, any deployment tasks that can be completed without the need for information about the second virtual machine 114B can be started such that many deployment tasks can be completed prior to the completion of the deployment of the second virtual machine 114B. Parallelizing deployment in this fashion saves time and, thus, costs.

According to the foregoing example, the second virtual machine 114B is instrumented with an instruction to send a notify request to the example dependency controller 140 of FIG. 1 when deployment of the second virtual machine 114B is completed (or reaches a point at which the deployment controller 140 can allow the deployment of the first virtual machine 114A to continue). When the example dependency controller 140 receives the notify request, the dependency controller 140 locates a matching wait request in the dependency database 142 of the illustrated example and sends a notification to the first virtual machine 114A that it may continue deploying (e.g., may continue executing a deployment plan (e.g., a local deployment plan)).

The dependency database 142 of the illustrated example stores information about wait requests and notify requests for deployments of virtual machines. The example dependency database 142 is a database that includes a table of wait requests, a table of notify requests, and a table of master keys that link wait requests with a corresponding notify requests. Alternatively, the dependency database 142 may be implemented by any other type of data storage. For example, the dependency database 142 may be implemented by multiple databases, by one or more files, and/or by any combination of data storage components.

The configuration controller 144 of the illustrated example collects and stores configuration information about virtual machines in the configuration repository 146. When virtual machines are deployed, the virtual machines transmit an asset tracking request to the configuration controller 144. In response to the asset tracking requests, the example configuration controller 144 captures asset information from the requesting virtual machine and stores the information in the configuration repository 146. In the illustrated example, the configuration controller 144 retrieves a virtual machine name, a network address, a role for the virtual machine, a unique identifier for the virtual machine, a deployment number for the virtual machine, and an identification of a workload for the virtual machine. A workload, as used herein, is an abstraction of the work that an application instance or a set of applications instances are to perform. For example, a workload may be implementing a web server, implementing a web server farm, implementing a multilayer application, etc.

The configuration controller 144 of the illustrated example provides configuration information retrieved from the configuration repository 146 to requesting virtual machines. For example, if the first virtual machine 114A is dependent on the deployment of the second virtual machine 114B, once the first virtual machine 114A is notified by the dependency controller 140 that the claimant of the second virtual machine 114B has completed, the first virtual machine 114A sends a request for configuration information of the second virtual machine 114B to the configuration controller 144. In response, the configuration controller 144 retrieves configuration information for the second virtual machine 114B from the configuration repository 146 and transmits the retrieved configuration information to the first virtual machine 114A.

The example configuration controller 144 of the illustrated example additionally provides a user interface (e.g., a graphical user interface) identifying the assets for which configuration information is included in the configuration repository 146. According to the illustrated example, the configuration controller 144 generates a graphical user interface listing the assets in the configuration repository 146 (e.g., in a tree structure) based on the workload of each of the assets. The example graphical user interface generated by the configuration controller 144 of FIG. 1 displays a workload followed by a collapsible list of the assets associated with that workload. For example, if the first virtual machine 114A and the third virtual machine 114C are associated with a web server, and the second virtual machine 114B is associated with a database server, the configuration controller 144 may display a first node for the web server followed by a collapsible list including the first virtual machine 114A and the third virtual machine 114C and a second node for the database server followed by a collapsible list including the third virtual machine 114B.

The configuration repository 146 of the illustrated example stores configuration information for virtual machines that is collected by the configuration controller 144. The example configuration repository 146 is implemented by a lightweight directory access protocol (LDAP) database. Alternatively, the configuration repository 146 may be implemented by any other type(s) of data storage. For example, the configuration repository 146 may be implemented by any other type(s) of database, by multiple databases, by one or more files, and/or by any combination of data storage components.

The service manager 148 of the illustrated example manages the deployment of virtual machines (e.g., virtual machine blueprints) according to assigned service levels identified in a profile. Example profiles identify various services to be utilized by deployed virtual machines and associate levels of those services to profiles. A service may be any task, resource, or plugin to be utilized by a virtual machine (e.g., network services, plugins, and/or resources; storage services, plugins, and/or resources; domain name services, plugins, and/or resources; database services, plugins, and/or resources; monitoring services, plugins, and/or resources; load balancing services, plugins, and/or resources; security services, plugins, and/or resources; etc.). Levels of the services may be associated with various costs and/or resource utilization levels. For example, three profiles may be utilized: gold, silver, and bronze. For each of the profiles, services of different levels (e.g., different costs) may be assigned. For example, a gold profile may be linked to 10 gigabit network services (e.g., most expensive services), a silver profile may be linked to 1 gigabit network services (e.g., mid-priced services), and a bronze profile may be linked to 100 megabit network services (e.g., lowest cost services). The example service manager 148 of FIG. 1 provides a user interface for creation of the profiles; adding services, resources, and/or plugins to the profiles; and displaying information about the profiles (e.g., cost, utilization information, etc.). Access to the profile configuration of the service manager 148 may be limited by authorization levels. For example, a highest level of access may allow the design and configuration of profile(s), a mid-level access may allow the assignment of virtual machines (e.g., by linking blueprints with a profile), and a lowest level access may allow deployment of blueprints linked to a profile. Accordingly, at the lowest level of access, the profile for a blueprint may not be changed and, thus, the deployment will be limited to the services, resources, and/or plugins assigned to that blueprint. Thus, the service manager 148 may facilitate cost and resources control in a cloud environment or other distributed deployment of virtual machines.

Figure 2:
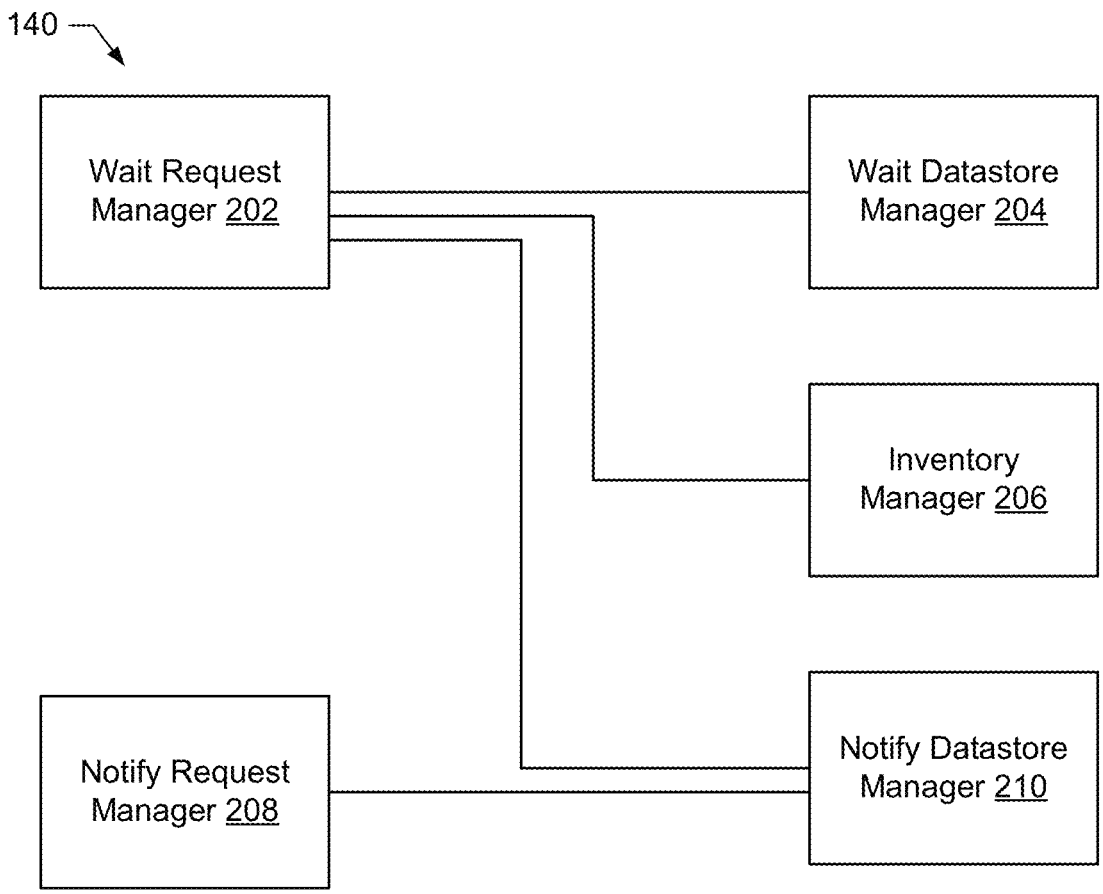
FIG. 2 is a block diagram of an example implementation of the dependency controller of FIG. 1.

FIG. 2 is a block diagram of an example implementation of the dependency controller 140 of FIG. 1. The example dependency controller 140 of FIG. 2 includes a wait request manager 202, a wait datastore manager 204, an inventory manager 206, a notify request manager 208, and a notify datastore manager 210.

The wait request manager 202 of the illustrated example receives wait requests sent during the provisioning of virtual machines. The wait request manager 202 transmits the received requests to the wait datastore manager 204. The example wait request manager 202 additionally requests inventory information about virtual machine assets from the inventory manager 206. For example, when a wait request is received, the wait request manager 202 of the illustrated example requests that the inventory manager 206 provide information about a virtual machine asset stored in the configuration repository 146 that matches the wait request. For example, the wait request may include information identifying a workload and/or a key field that identifies a virtual machine asset that can fulfill the wait request (e.g., a key identifying a type of database server that must be provisioned prior to completing provisioning of the virtual machine that sent the wait request). When the example wait request manager 202 of FIG. 2 determines that a matching provisioned asset already exists or the wait request manager 202 determines that a notification for a matching provisioned asset is available by querying the notify datastore manager 210, the wait request manager 202 of the illustrated example notifies the virtual machine that sent the wait request that provisioning may continue.

The wait datastore manager 204 of the illustrated example receives information about wait requests from the wait request manager 202 and stores the wait request information in a table of wait requests in the example dependency database 142. The wait datastore manager 204 of the illustrated example additionally retrieves information about pending wait requests so that the wait request manager 202 can query the inventory manager 206 and/or the notify datastore manager 210 to determine if any wait requests have been fulfilled. When a wait request has been fulfilled, the wait datastore manager 204 of the illustrated example removes the wait request from the dependency database 142.

The inventory manager 206 of the illustrated example receives and processes requests for asset information in the example configuration repository 146. In the illustrated example, the inventory manager 206 receives query parameters such as a workload name and/or key field from the wait request manager 202 and performs an LDAP query of the example configuration repository using the received query parameters. Alternatively, the inventory manager 206 may perform any other type(s) of query(s) to retrieve available information from the configuration repository 146.

The example notify request manager 208 of FIG. 2 receives notify requests during the provisioning of virtual machines that have been instrumented to transmit the notify request. The notify request manager 208 of the illustrated example sends the notify requests to the notify datastore manager 210 for storage in the dependency database 142. The example notify request manager 208 may additionally validate the notify request. For example, if the notify request indicates that a particular service is provisioned (e.g., a database service), the notify request manager 208 may validate that the database service is available by attempting to access the database service, may verify that information about the database service has been entered into the configuration repository 146, etc.

The notify datastore manager 210 of the illustrated example receives notify requests from the notify request manager 208 and stores the notify requests in a table of notify requests in the dependency database 142. Additionally, the notify datastore manager 210 of this example queries the dependency database 142 for notify requests in response to a request from the wait request manager 202 attempting to determine if a wait request has been satisfied by a notify request. According to the illustrated example, when a wait request has been fulfilled, the corresponding notify request remains in the dependency database 142 (e.g., where further virtual machines may rely on the notify request). Alternatively, when a wait request has been fulfilled, the notify datastore manager 210 may remove the corresponding notify request from the dependency database 142 (e.g., once the notify datastore manager 210 determines that there are no further virtual machines that rely on the notify request).

Figure 3:
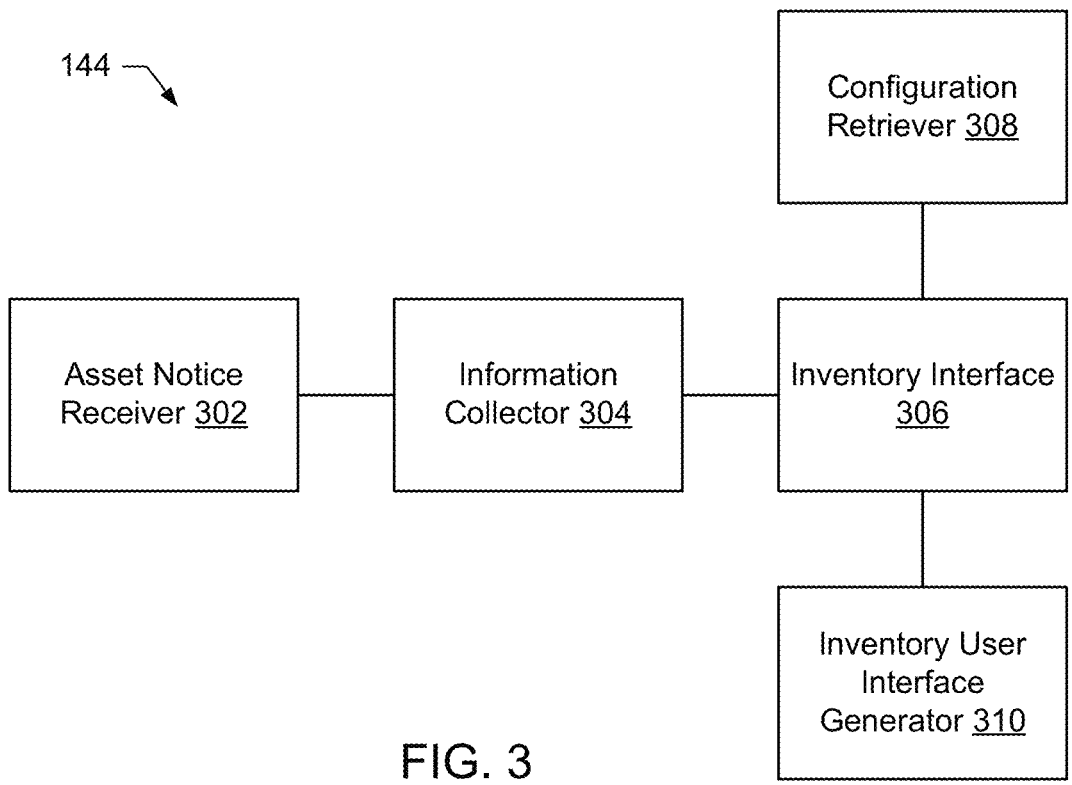
FIG. 3 is a block diagram of an example implementation of the configuration controller of FIG. 1.

FIG. 3 is a block diagram of an example implementation of the configuration controller 144 of FIG. 1. The example configuration controller 144 of this example includes a notice receiver 302, an information collector 304, an inventory interface 306, a configuration retriever 308, and an inventory user interface generator 310.

The asset notice receiver 302 of the illustrated example receives reports of new virtual machine assets. For example, during provisioning of virtual machines, the virtual machines may be instrumented with an instruction to transmit an asset notice to the asset notice receiver 302. The asset notice receiver 302 sends the asset notice to the information collector 304 of the illustrated example.

In response to receiving an asset notice from the example asset notice receiver 302, the information collector 304 of the illustrated example retrieves asset information (e.g., configuration information, settings, identification information, etc.) from the virtual machine that transmitted the asset notice. Alternatively, asset information may be retrieved from any other location or device that carries the asset information. For example, the information collector 304 may retrieve a name for the virtual machine, a workload associated with the virtual machine, a network address of the virtual machine, the unique identifier for the virtual machine, a deployment identifier, user credentials, information about services available at the virtual machine, etc. The example information collector 304 transmits the collected information to the inventory interface 306 for storage in the configuration repository 146.

The inventory interface 306 of the illustrated example receives information collected by the example information collector 304 and stores the information in the example configuration repository 146. The example inventory interface 306 of FIG. 3 retrieves information from the example configuration repository 146 in response to requests from the example configuration retriever 308 and/or the example inventory user interface generator 310. The inventory interface 306 of the illustrated example interfaces with the configuration repository 146 using LDAP. Alternatively, any other interface and/or protocol may be utilized for accessing the configuration repository 146.

The configuration retriever 308 of the illustrated example receives requests for configuration information on virtual machines and retrieves the requested configuration information via the example inventory interface 306. For example, after the first virtual machine 114A has been notified that the second virtual machine 114B has been provisioned, the first virtual machine 114A transmits a request to the configuration retriever 308 requesting configuration information for the second virtual machine 114B. For example, the first virtual machine 114A may request configuration information that includes a network address for the second virtual machine 144B so that the first virtual machine 114A may configure installed applications and/or services to access a resource at the second virtual machine 114B once the first virtual machine 114A has been provisioned.

The inventory user interface generator 310 of the illustrated example receives user requests for asset inventory information and provides a user interface to provide the asset information. The example inventory user interface generator 310 of FIG. 3 lists asset information in a hierarchical tree (e.g., as nodes nested in other nodes). According to the illustrated example, asset information is displayed in a graphical user interface that provides a collapsible list of virtual machine assets (e.g., graphically displayed nodes) underneath (e.g., nested in) an identification of the workload (e.g., a graphically displayed node for the workload) to which the asset is assigned. Accordingly, even if the virtual machine name is not descriptive or is unknown to the user, the workload to which the virtual machine belongs is readily ascertainable.

While example manners of implementing the dependency controller 140 and the configuration controller 144 of the cloud manager 138 are illustrated in FIGS. 1-3, one or more of the elements, processes and/or devices illustrated in FIGS. 1-3 may be combined, divided, re-arranged, omitted, eliminated and/or implemented in any other way. Further, the example wait request manager 202, the example wait database manager 204, the example inventory manager 206, the example notify request manager 208, the example notify datastore manager 210 of FIG. 2, the example dependency controller 140, the example asset notice receiver 302, the example information collector 304, the example inventory interface 306, the example configuration retriever 308, the example inventory user interface generator 310 of FIG. 3 and/or the example configuration controller 144 may be implemented by hardware, software, firmware and/or any combination of hardware, software and/or firmware. Thus, for example, any of the example wait request manager 202, the example wait database manager 204, the example inventory manager 206, the example notify request manager 208, the example notify datastore manager to 210 of FIG. 2 and/or the example dependency controller 140, the example asset notice receiver 302, the example information collector 304, the example inventory interface 306, the example configuration retriever 308, the example inventory user interface generator 310 of FIG. 3 and/or the example configuration controller 144 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, wait request manager 202, the example wait database manager 204, the example inventory manager 206, the example notify request manager 208, the example notify datastore manager to 210 of FIG. 2, the example dependency controller 140, the example asset notice receiver 302, the example information collector 304, the example inventory interface 306, the example configuration retriever 308, the example inventory user interface generator 310 of FIG. 3, and/or the example configuration controller 144 is/are hereby expressly defined to include a tangible computer readable storage device or storage disk such as a memory, a digital versatile disk (DVD), a compact disk (CD), a Blu-ray disk, etc. storing the software and/or firmware. Further still, the example cloud manager 138, the example dependency controller 140, and/or the example configuration controller 144 of FIG. 1 3 may include one or more elements, processes and/or devices in addition to, or instead of, those illustrated in FIGS. 1-3, and/or may include more than one of any or all of the illustrated elements, processes and/or devices.

A flowchart representative of example machine readable instructions for implementing the cloud manager 138, the dependency controller 140, and/or the configuration controller 144 of FIGS. 1-3 are shown in FIGS. 4-9. In these examples, the machine readable instructions comprise a program for execution by a processor such as the processor 1712 shown in the example processor platform 1700 discussed below in connection with FIG. 17. The program may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 4-9, many other methods of implementing the example cloud manager 138, the example dependency controller 140, and/or the example configuration controller 144 may alternatively be used. For example, the order of execution of the blocks may be changed, and/or some of the blocks described may be changed, eliminated, or combined.

As mentioned above, the example processes of FIGS. 4-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
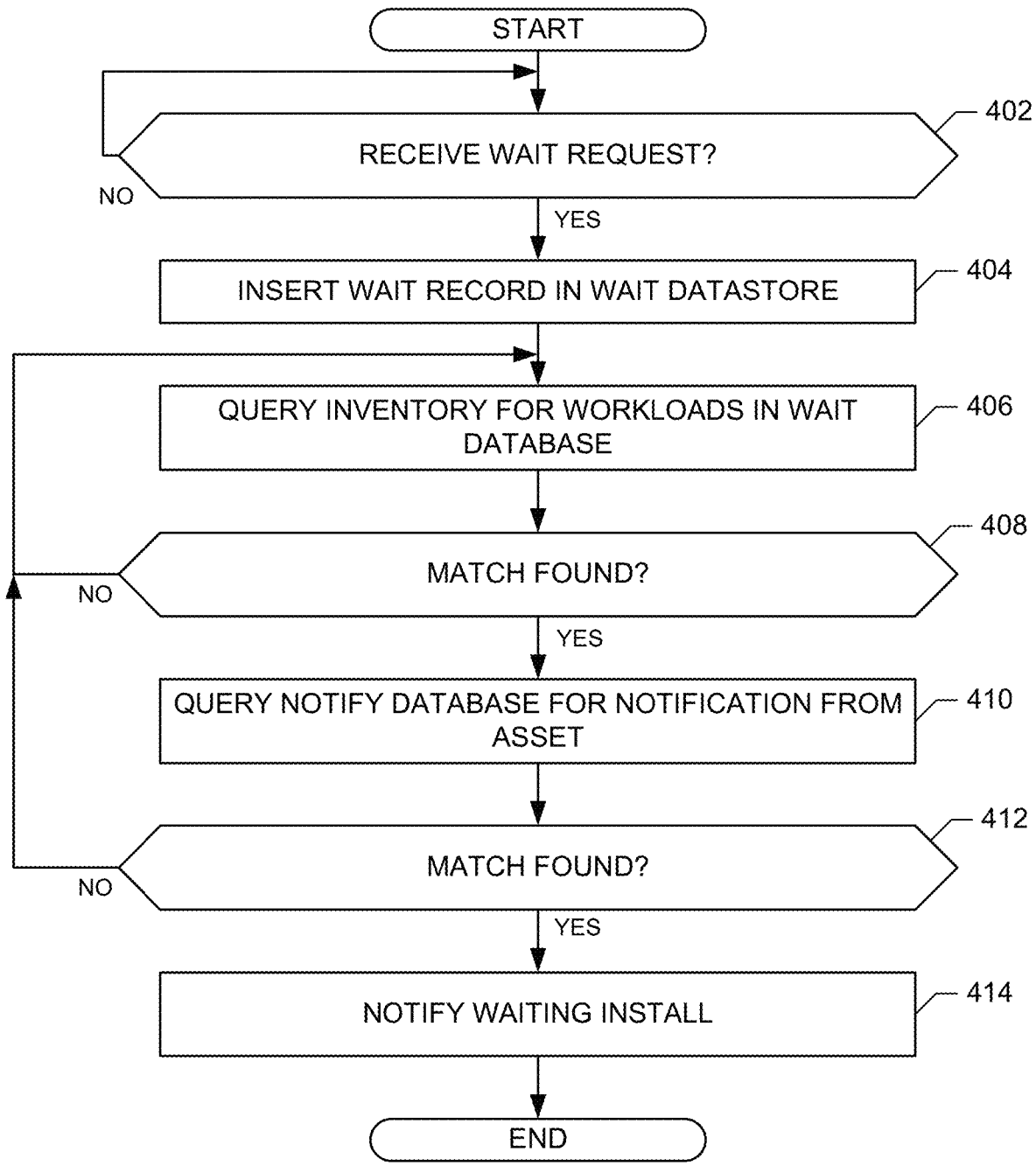
FIGS. 4-5 are flowcharts representative of example machine readable instructions that may be executed to implement the dependency controller of FIGS. 1 and/or 2.

FIG. 4 is a flowchart representative of an example program for the example dependency controller 140 to handle wait requests. The example program of FIG. 4 begins at block 402 when the example wait request manager 202 receives a wait request from a virtual machine. The example wait datastore manager 204 for stores to wait request in a wait data store of the example configuration repository 146 (block 404). In response to the wait request, the wait request manager 202 queries the asset inventory via the example inventory manager 206 for workloads that match the wait request to determine if a virtual machine asset that is responsive to the wait request has been stored (block 406). If a match is not found (block 408), control returns to continue querying the inventory until a matching workload and/or virtual machine asset is identified. For example, if the wait request indicates that a database server is required to fulfill the wait request, the wait request manager 202 queries the inventory manager for a database server that belongs to a workload of the virtual machine that issued the wait request.

If a matching virtual machine asset is located (block 408), the example wait request manager 202 queries the dependency database 142 for a notify request for the virtual machine asset identified in the query of the inventory (block 410). For example, the notify request may be stored once the identified virtual machine asset has successfully deployed and/or sufficiently deployed to fulfill the wait request. When a matching notify request is not found (block 412), control returns to block 406 to continue waiting (e.g., the wait request manager periodically retrieves pending wait requests via the wait datastore manager 204 and checks for a matching asset and notify request).

When a matching notify request is found (block 414), the wait request manager 202 notifies the waiting virtual machine deployment that the wait request has been fulfilled and that deployment of the virtual machine may continue. The instructions of FIG. 4 are then complete.

Figure 5:
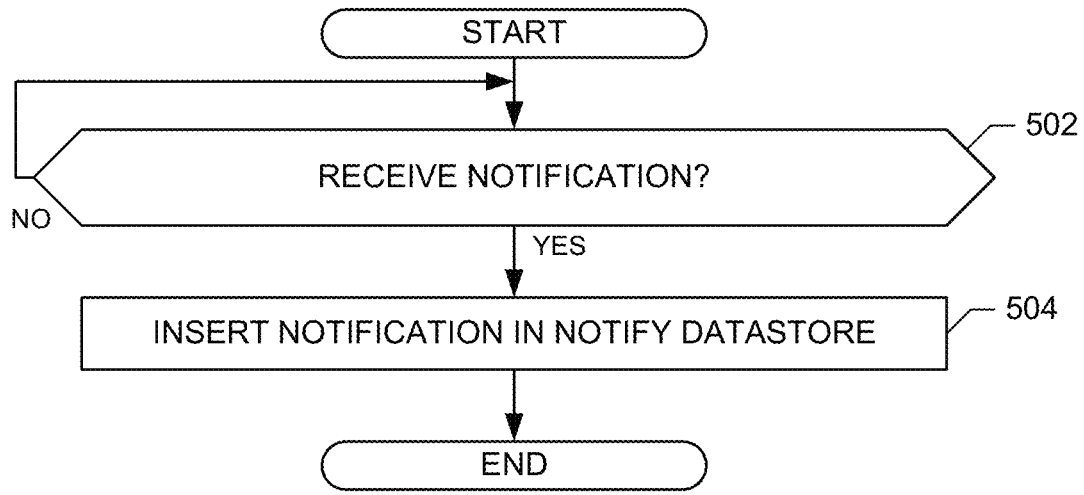

FIG. 5 is a flowchart representative of an example program for the dependency controller 140 to handle notify requests. The example program of FIG. 5 begins at block 502 when the notify request manager 208 receives a notify request. The example notify datastore manager 210 stores the notify request in a table of notify requests in the dependency database 142 (block 504). Additionally or alternatively, the notify data store manager 210 may notify the example request manager 202 of the received notify request.

Figure 6:
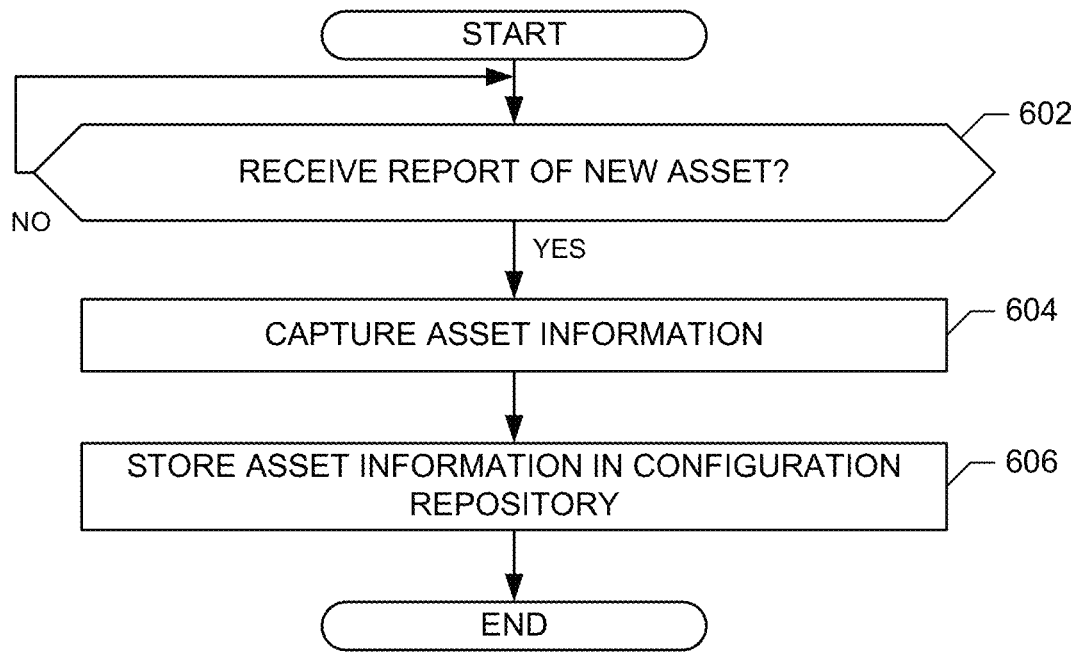
FIGS. 6 and 9 are flowcharts representative of example machine readable instructions that may be executed to implement the configuration controller of FIGS. 1 and/or 3.

FIG. 6 is a flowchart representative of an example program for the configuration controller to handle reports of new assets. The example program of FIG. 6 begins at block 602 when the example asset receiver 302 receives a report of a new asset from a virtual machine for which deployment has been initiated. In response to the report of the new asset, the information collector 304 of the illustrated example captures asset information for the virtual machine (block 604). The inventory interface 306 stores the asset information in the example configuration repository 146 (block 606).

Figure 7:
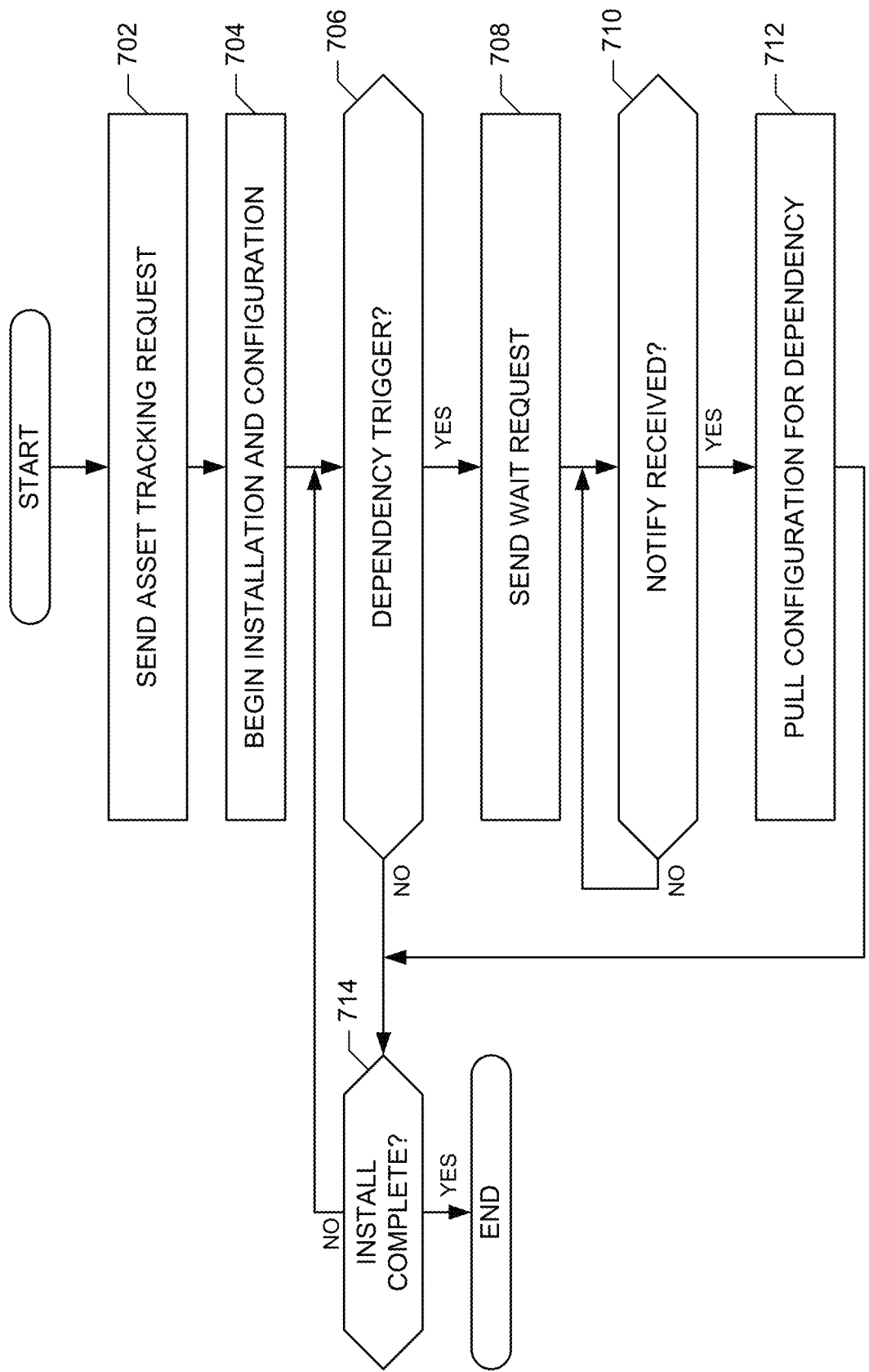
FIGS. 7-8 are flowcharts representative of example machine readable instructions that may be executed during provisioning of a virtual machine blueprint in accordance with the methods and apparatus disclosed herein.
Figure 8:
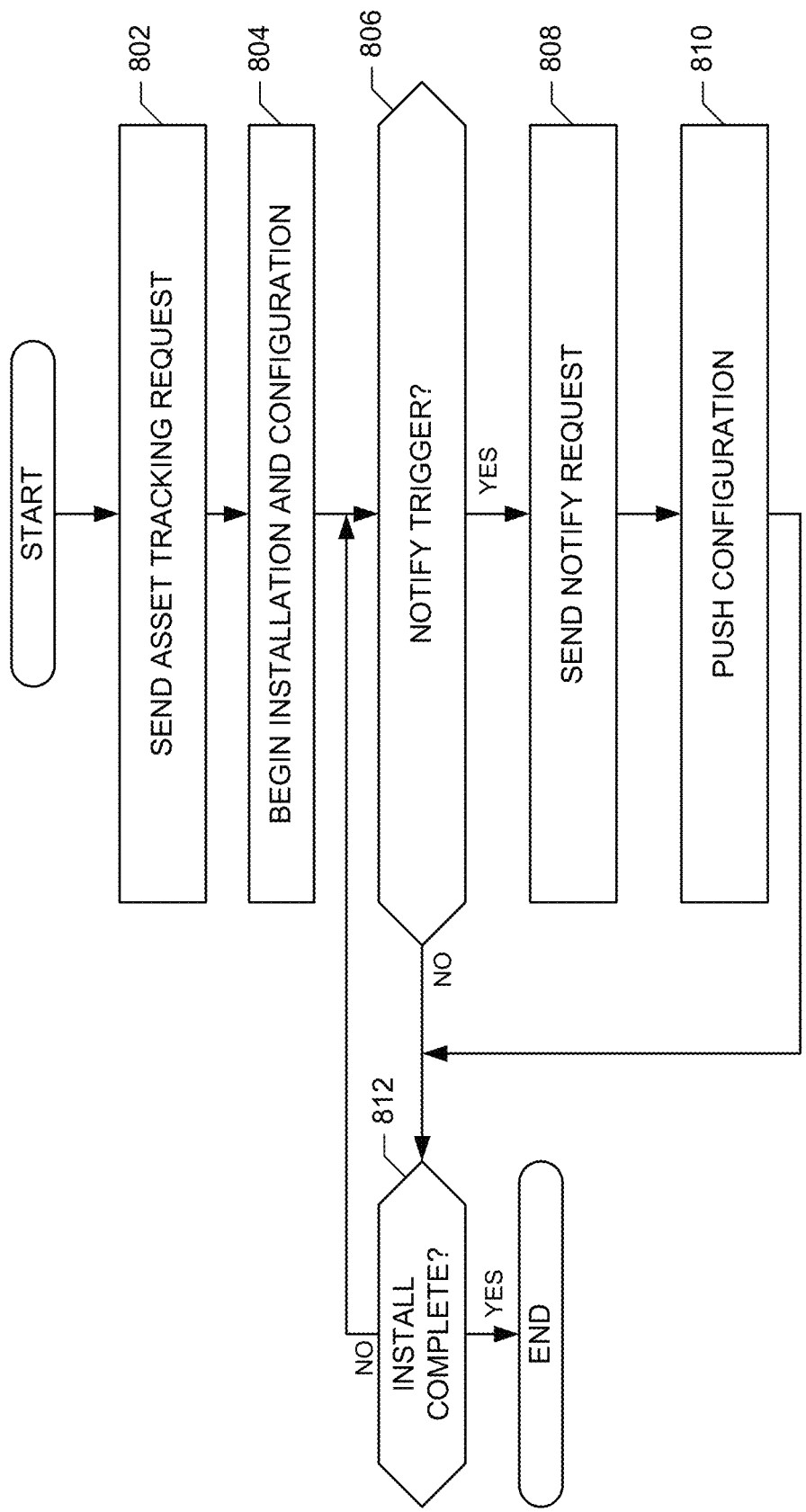

FIGS. 7-8 are flowcharts representative of example machine readable instructions that may be executed during provisioning of a virtual machine blueprint in accordance with the methods and apparatus disclosed herein. The example program of FIG. 7 begins at block 702 when deployment of the virtual machine is initiated and the virtual machine transmits an asset tracking request to the example asset notice receiver 302 of the example configuration controller 144. The virtual machine begins installation and configuration according to the tasks assigned to the virtual machine deployment (block 704). For example, virtual machines may be deployed and application binaries to be installed on the virtual machines may be copied to the virtual machines and installed. The virtual machine deployment determines if a dependency trigger node has been reached in the set of tasks for deployment (block 706). If a dependency trigger node has not been reached, control proceeds to block 714.

If a dependency trigger has been reached (block 706), the virtual machine sends a wait request to the example wait request manager 202 of the example dependency controller 140 (block 708). The example wait request of the illustrated example includes a timeout indicating a maximum duration to wait before proceeding with provisioning. The example wait request includes a key value that may be utilized to identify a matching notify request that includes the same key value. The wait request may additionally include other parameters such as, for example, a name for an environment for the deployment, an identification of a choke file that may be used to trigger the waiting to cease, the name of a user that initiated the deployment, a profile name indicating a service level for the deployment, an indication of whether a timeout and/or choke file should cause an error to be issued or if deployment should continue without error, etc.

After sending the wait request (block 708), deployment is paused while the virtual machine awaits a response from the example wait request manager 202 that a notify request corresponding to the wait request has been received (block 710). When a notify request has been received (block 710), the virtual machine deployment sends a pull request for configuration information for the virtual machine dependency via the configuration retriever 308 of the configuration controller 144 (block 712). Alternatively, the configuration retriever 308 may transmit the configuration information to the virtual machine in response to the notify request without receiving a pull request. Control then proceeds to block 714. Additionally or alternatively, control may proceed to block 714 when a manual request is received and/or when a timeout is reached.

After the virtual machine deployment pulls configuration information (block 712) or the deployment determines that a dependency trigger has not been reached (block 706), the virtual machine deployment determines if deployment has completed (block 714). If deployment has not completed, control proceeds to block 706 and the deployment continues until the next dependency trigger (block 706) and deployment completes (block 714). If deployment has completed, the instructions of FIG. 7 are complete.

The example program of FIG. 8 may be performed by the deployed virtual machine, the deployment director 124, and/or any other component that is responsible for deploying virtual machines. The example program of FIG. 8 begins at block 802 when deployment of the virtual machine is initiated and the virtual machine transmits an asset tracking request to the example asset notice receiver 302 of the example configuration controller 144 of FIG. 3. The virtual machine begins installation and configuration according to the tasks assigned to the virtual machine deployment (e.g., the deployment director 124 may initiate installation and configuration) (block 804). The virtual machine deployment (e.g., the virtual machine deployment plan causes the deployment director 124 to) determines if a notify trigger node has been reached in the set of tasks for deployment (block 806). If a notify trigger node has not been reached, control proceeds to block 812.

If a notify trigger has been reached (block 806), the virtual machine sends a notify request to the example notify request manager 208 of the example dependency controller 140 (block 808). The example notify request includes an identification of a key that corresponds to a key identified in a wait request that is fulfilled by the notify request. The notify request may additionally include a name of an environment for the deployment, a name of a user that initiated the deployment, a name of a profile indicating a service level for the deployment, etc. The virtual machine deployment (e.g., the deployment plan causes the deployment director 124 to) then pushes configuration information for the virtual machine to the configuration repository 146 via the information collector 304 of the configuration controller 144 (block 810). Control then proceeds to block 812.

After the virtual machine deployment pushes the configuration information (block 810) or the deployment determines that a notify trigger has not been reached (block 806), the virtual machine deployment determines if deployment has completed (block 812). If deployment has not completed, control proceeds to block 806 and the deployment continues until the next notify trigger (block 806) and deployment completes (block 812). If deployment has completed, the instructions of FIG. 8 are complete.

While the examples of FIGS. 7 and 8 illustrate instructions in which virtual machine deployments check for either a dependency trigger (FIG. 7) or a notify trigger (FIG. 8), a single set of instructions may check for both dependency triggers and notify triggers and virtual machines may include one or both of dependency triggers and notify triggers.

Figure 9:
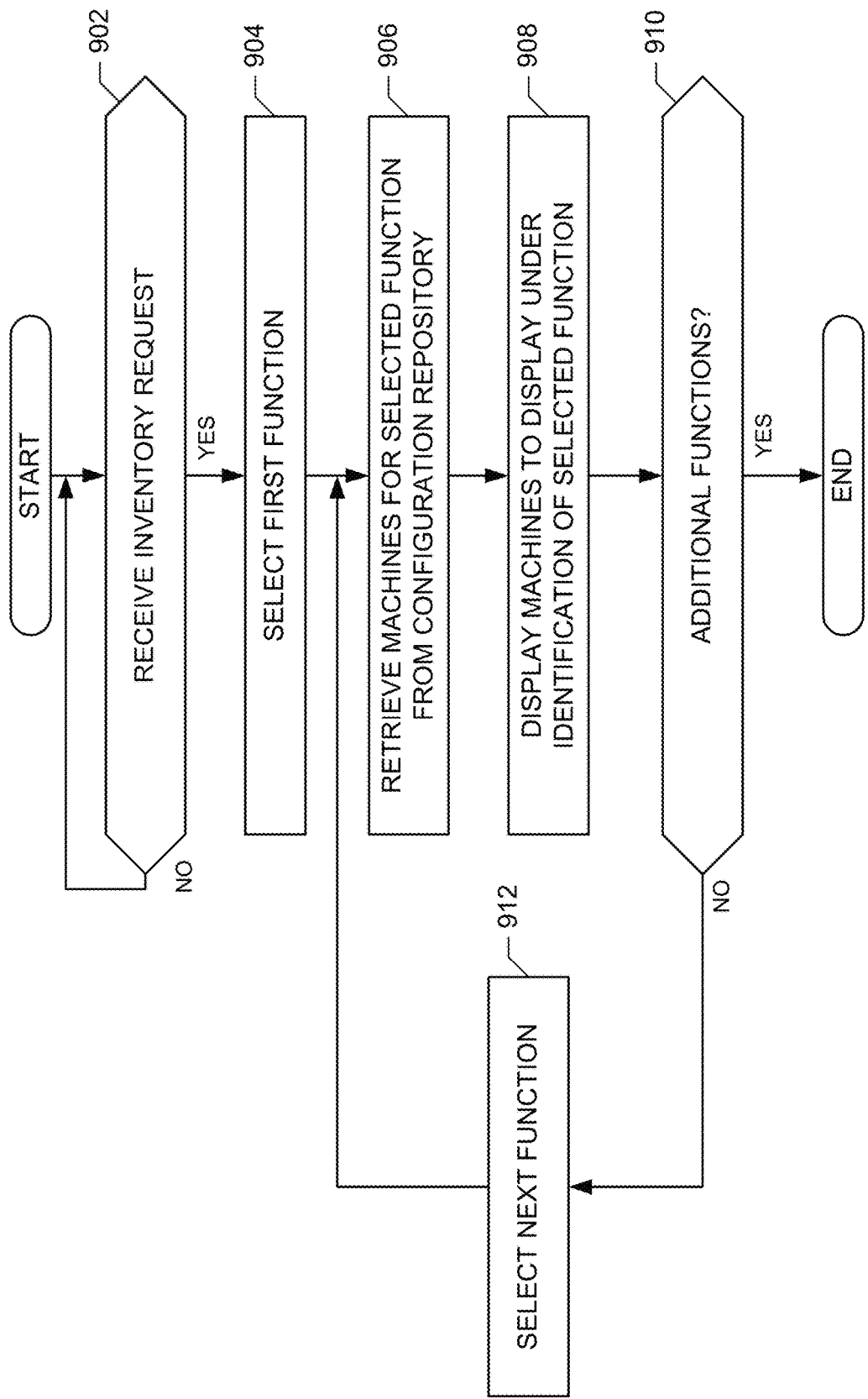

FIG. 9 is a flowchart representative of example machine readable instructions that may be executed to implement the configuration controller 144 of FIGS. 1 and/or 3. The example program of FIG. 9 begins at block 902 when the example inventory user interface generator 310 of FIG. 3 receives a request to list the inventory. The example inventory user interface generator 310 of FIG. 3 selects a first function (e.g., a workload, a task name, etc.) from the example configuration repository 146 (block 904). The example user interface generator 310 of FIG. 3 retrieves virtual machine assets that are tagged with the first function from the example configuration repository 146 (block 906). For example, the inventory user interface generator 310 may cause the example inventory interface to send an LDAP request for virtual machines associated with a first workload.

The example inventory user interface generator 310 of the illustrated example displays the virtual machines identified at block 906 under an identification of the first function (block 908). The example user interface generator 310 of FIG. 3 then determines if additional functions are included in the configuration repository 146 (block 910). If additional functions are included in the configuration repository 146, the inventory user interface generator 310 then selects the next function (block 912) and control proceeds to block 906 to process the next selected function. If there are no additional functions (block 910), the instructions of FIG. 9 are complete.

In the foregoing examples, wait requests are sent by virtual machines, notices that wait requests have been fulfilled are sent to virtual machines, and notify requests are sent by virtual machines. Additionally or alternatively, requests and/or notifications may be sent to/by any other component. For example, an application director managing the deployment of virtual machine resources may send requests and/or receive notifications that requests have been fulfilled.

Figure 10:
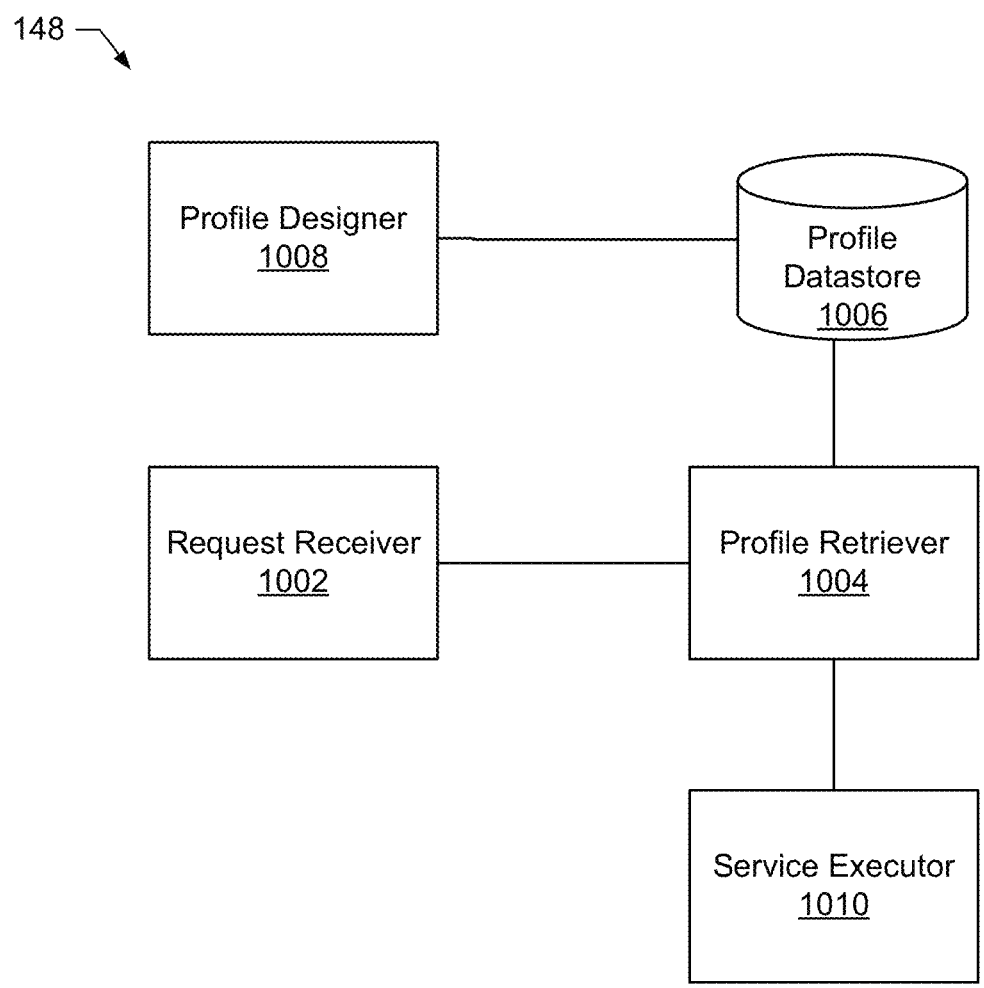
FIG. 10 is a block diagram of an example implementation of the service manager of FIG. 1.

FIG. 10 is a block diagram of example components of an example implementation of the service manager 148 of FIG. 1. The example service manager 148 of this example includes an example request receiver 1002, an example profile retriever 1004, an example profile datastore 1006, an example profile designer 1008, and an example service executor 1010.

The request receiver 1002 of the illustrated example receives requests for information associated with a service from a virtual machine during deployment. In the illustrated example, the request includes an identification of a profile assigned to the virtual machine deployment, which is transmitted to the example profile retriever 1004. Alternatively, the request may identify the virtual machine and/or a blueprint for the virtual machine and the request receiver 1002 may send the identification to the example profile retriever 1004 to identify the profile assigned to the virtual machine based on information stored in the example profile datastore 1006.

The profile retriever 1004 of the illustrated example receives requests for profile information from the example request receiver 1002 and queries the example profile datastore 1006 for information to fulfill the requests. The example profile retriever 1004 of FIG. 10 provides information about the retrieved information to the example service executor 1010, which performs tasks on the virtual machine that sent the request using the retrieved information. For example, if a virtual machine being deployed is associated with a mid-level profile (e.g., a silver profile), the profile retriever 1004 of the illustrated example may determine that the virtual machine is to receive mid-level network service, mid-level storage service, and a monitoring plugin. In such an example, the profile retriever 1004 sends a notification of the mid-level services to the example service executor 1010.

The profile datastore 1006 of the illustrated example stores profile information for virtual machines that is designed via the example profile designer 1008. The example profile information links services, resources, plugins, etc. that are utilized with virtual machines with profile levels. The example profile information may additionally include information about costs and resource utilization associated with the various profile levels. The example profile datastore 1006 of FIG. 10 is implemented by a database. Alternatively, the profile datastore 1006 may be implemented by any other type of data storage. For example, the profile datastore 1006 may be implemented by multiple databases, by one or more files, and/or by any combination of data storage components.

The profile designer 1008 of the illustrated example provides an interface to facilitate user creation of and/or updating of profiles. The example profile designer 1008 provides a graphical user interface that receives input of a new profile name and services, resources, and/or plugins to be assigned to the new profile. The example profile designer 1008 may additionally receive input of cost information for profiles, security and/or access information for profiles, etc. The profile designer 1008 of this example stores the profile information in the example profile datastore 1006.

The service executor 1010 of the illustrated example receives profile information associated with a virtual machine that sent a request to the example request receiver 1002 and executes the tasks associated with the profile on the virtual machine. The service executor 1010 may assign network resources (e.g., attach the virtual machines to a particular network, allocate access to network elements, etc.), may assign storage resource, may configure security restrictions, may install plugins in the virtual machines, and/or perform any other task associated with the identified profile.

While an example manner of implementing the service manager 148 of the cloud manager 138 is illustrated in FIGS. 1 and 10, one or more of the elements, processes and/or devices illustrated in FIGS. 1 and 10 may be combined, divided, re-arranged, omitted, eliminated and/or implemented in any other way. Further, the example request receiver 1002, the example profile retriever 1004, the example profile designer 1008, the example service executor 1010 of FIG. 10 and/or the example service manager 148 may be implemented by hardware, software, firmware and/or any combination of hardware, software and/or firmware. Thus, for example, any of the example request receiver 1002, the example profile retriever 1004, the example profile designer 1008, the example service executor 1010 of FIG. 10 and/or the example service manager 148 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request receiver 1002, the example profile retriever 1004, the example profile designer 1008, the example service executor 1010 of FIG. 10 and/or more generally the example service manager 148 is/are hereby expressly defined to include a tangible computer readable storage device or storage disk such as a memory, a digital versatile disk (DVD), a compact disk (CD), a Blu-ray disk, etc. storing the software and/or firmware. Further still, the example cloud manager 138 and/or the example service manager 148 of FIG. 1 may include one or more elements, processes and/or devices in addition to, or instead of, those illustrated in FIGS. 1 and 10, and/or may include more than one of any or all of the illustrated elements, processes and devices.

Figure 11:
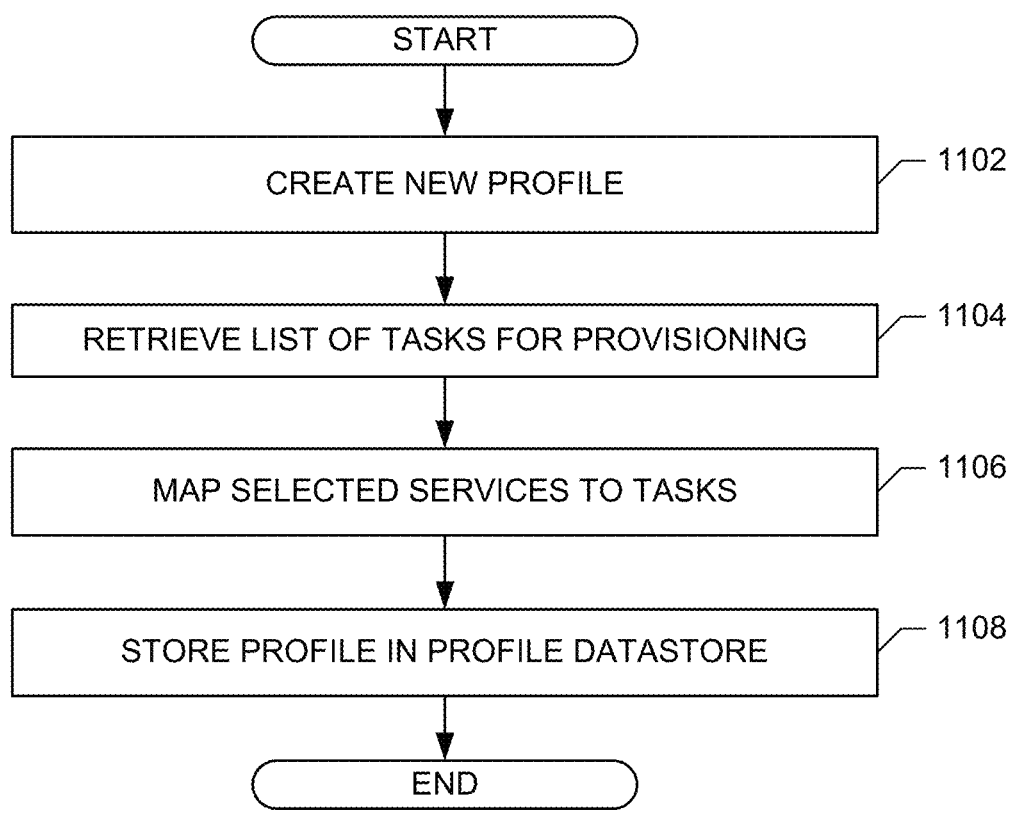
FIGS. 11-12 are flowcharts representative of example machine readable instructions that may be executed to implement the service manager of FIGS. 1 and/or 10.
Figure 12:
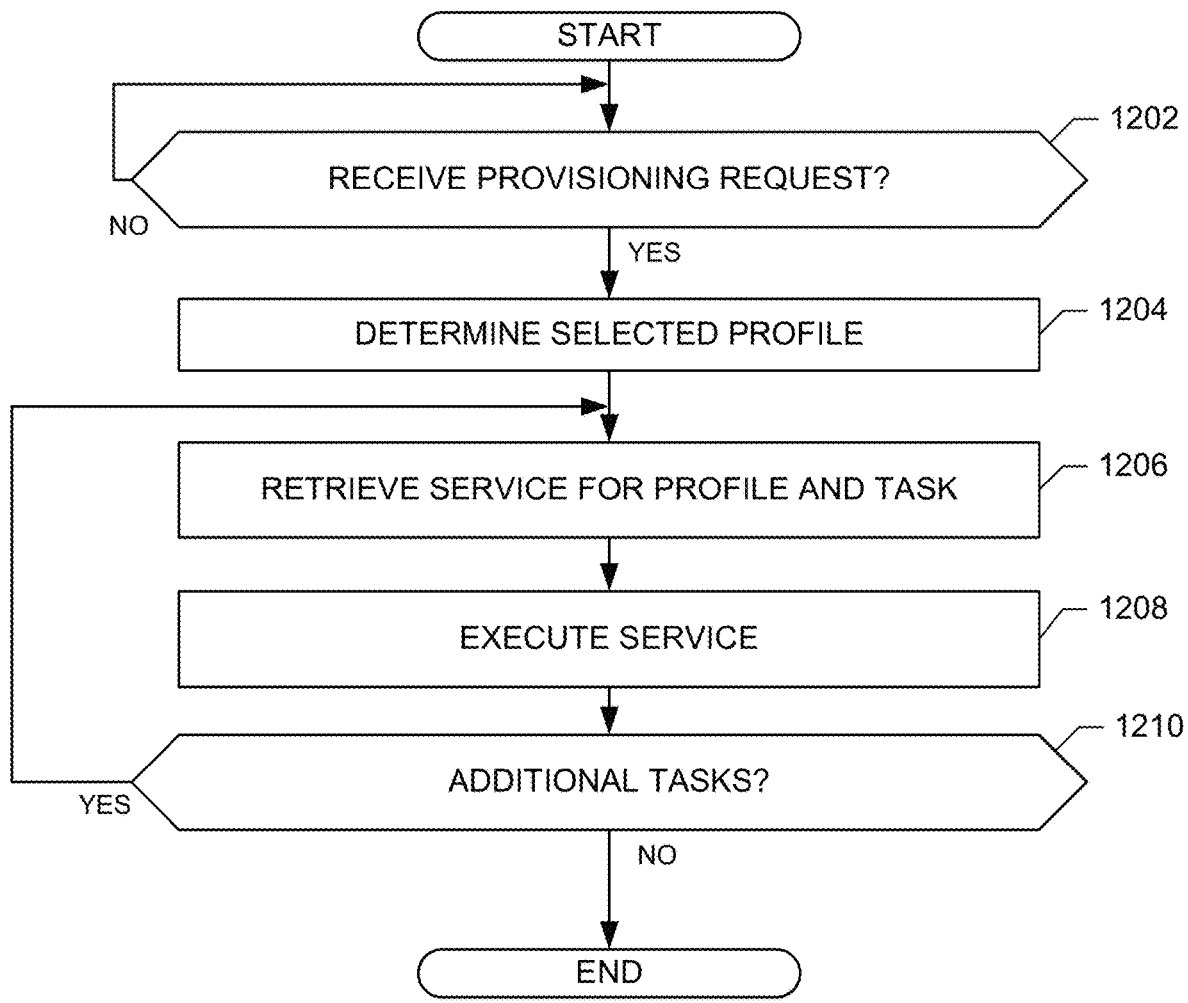

Flowcharts representative of example machine readable instructions for implementing the cloud manager 138, and/or the service manager 148 of FIGS. 1 and 10 are shown in FIGS. 11-12. In these examples, the machine readable instructions comprise a program for execution by a processor such as the processor 1712 shown in the example processor platform 1700 discussed below in connection with FIG. 17. The program may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart illustrated in FIGS. 11-12, many other methods of implementing the example cloud manager 138 and/or the example service manager 148 may alternatively be used. For example, the order of execution of the blocks may be changed, and/or some of the blocks described may be changed, eliminated, or combined.

As mentioned above, the example processes of FIGS. 11-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). Additionally or alternatively, the example processes of FIGS. 11-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

The example program of FIG. 11 begins at block 1102 when the profile designer 1008 receives a request to create a new profile. For example, the request to create the new profile may include a name for the profile, cost parameters for the profile, resource usage parameters for the profile, etc. The example profile designer 1008 of the illustrated example retrieves a list of tasks for provisioning a virtual machine (block 1104). For example, the profile designer 1008 may retrieve a network provisioning task, a storage provisioning task, etc. The example profile designer 1008 maps services for the profile with the provisioning tasks (block 1106). For example, the profile designer 1008 may map a particular level of storage service to the storage provisioning task (e.g., a low cost storage service may be mapped to a storage provisioning task in a low cost profile). The example profile datastore 1006 stores the assigned profile information in the profile datastore 1006 (block 1108).

The example program of FIG. 12 begins at block 1202 when the example request receiver 1002 receives a provisioning request for a virtual machine. The example request receiver 1002 determines a selected profile for the virtual machine (block 1204). For example, the request receiver 1002 may determine the selected profile based on an identification of the selected profile in the provisioning request and/or by retrieving information about the selected profile from the example profile datastore 1006. The example profile retriever 1004 of the illustrated example retrieves a service for a first task in the retrieved profile (block 1206). The example service executor 1010 then executes the first task for the service identified in the profile (block 1208). The profile retriever 1004 determines if there are additional tasks to be executed (block 1210). If there are additional tasks to be executed, control returns to block 1206 to process next task. If there are no additional tasks to be executed (block 1210), the instructions of FIG. 12 are completed.

Figure 13:
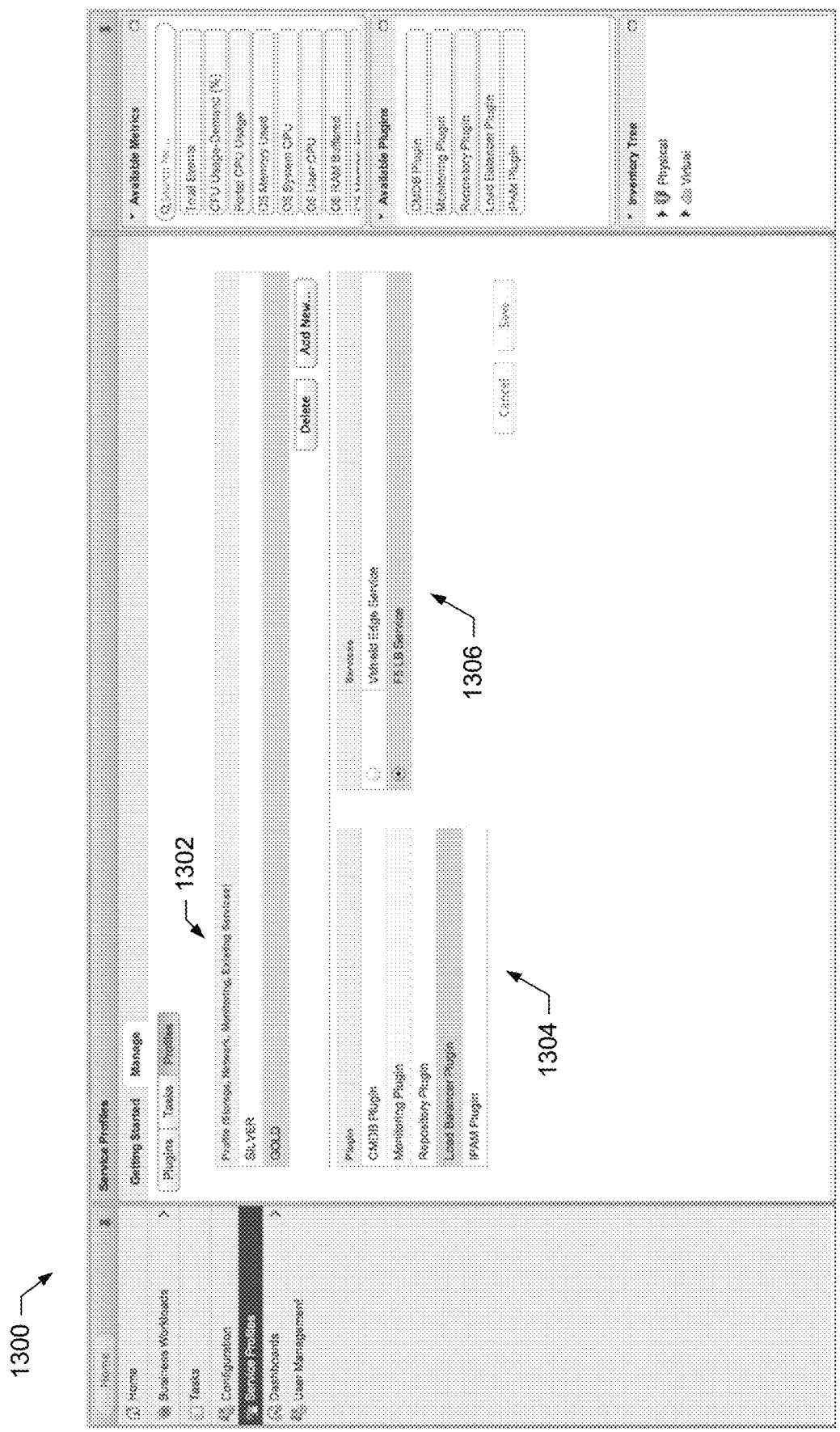
FIG. 13-16 illustrate graphical user interfaces for managing and executing profile tasks.

FIG. 13 illustrates a graphical user interface 1300 for creating a service level profile. The example graphical user interface 1300 includes a listing of service level profiles 1302 (e.g., gold level profile, silver level profile, bronze level profile, etc.). When a service level is selected in the listing of service level profiles 1302 a list of available plugins 1304 is displayed. When a plugin is selected from the list of available plugins 1304, a list of services 1306 corresponding to the selected plugin is displayed. The user managing the profiles may then select a particular service to be associated with the profile selected in the listing of service level profiles 1302. Accordingly, a profile may be developed that includes a particular set of services such that a blueprint linked to the service level profile may automatically be assigned the particular set of services without the need for creating separate blueprints for each desired service level.

Figure 14:
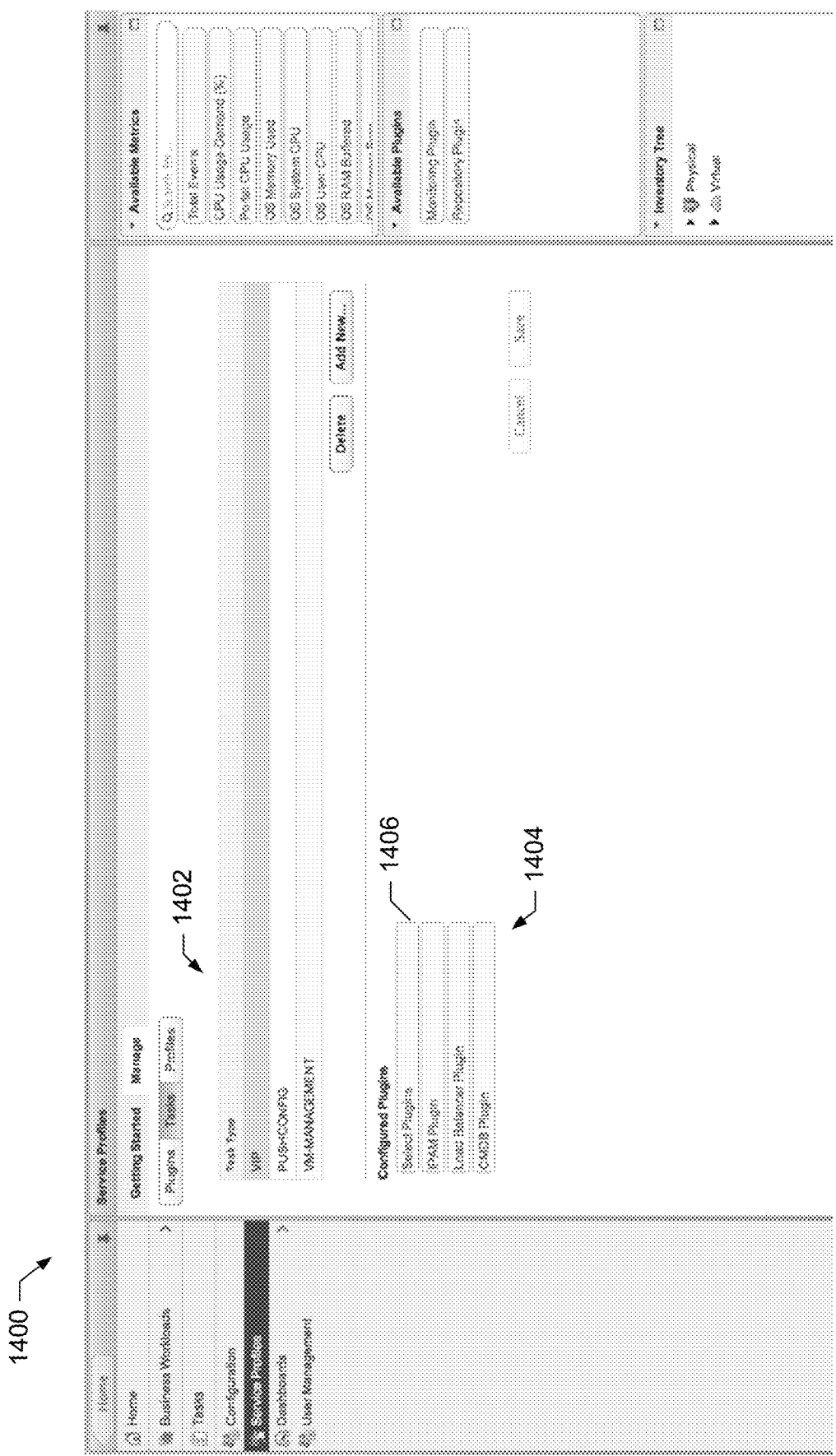

FIG. 14 illustrates an example graphical user interface 1400 for creating tasks to be included in service level profiles. The example graphical user interface 1400 of FIG. 14 includes a listing of previously created task types 1402. New task types may be added. When a task is selected from the listing of previously created task types 1402, a listing of available plugins 1404 is displayed. A user managing the tasks may select a button 1406 to add additional plugins to the select task type.

Figure 15:
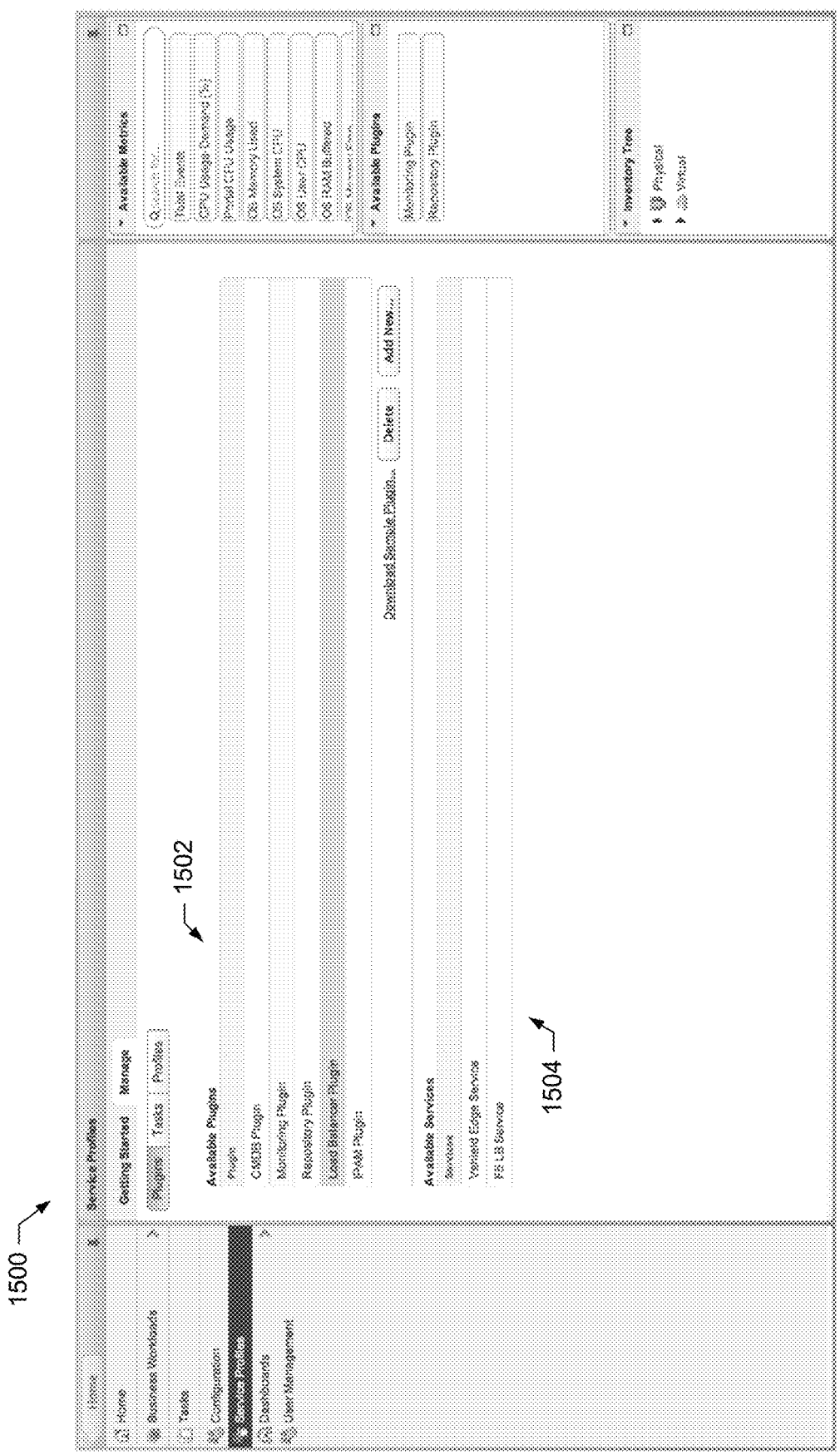

FIG. 15 illustrates an example graphical user interface 1500 for managing plugins for service level profiles. The example graphical user interface 1500 of FIG. 15 includes a listing of previously added plugins 1502. New plugins may be added by importing a plugin description file. When a plugin is selected from the listing of previously added plugins 1502, a listing of service options 1504 associated with the selected plugin is displayed.

Figure 16:
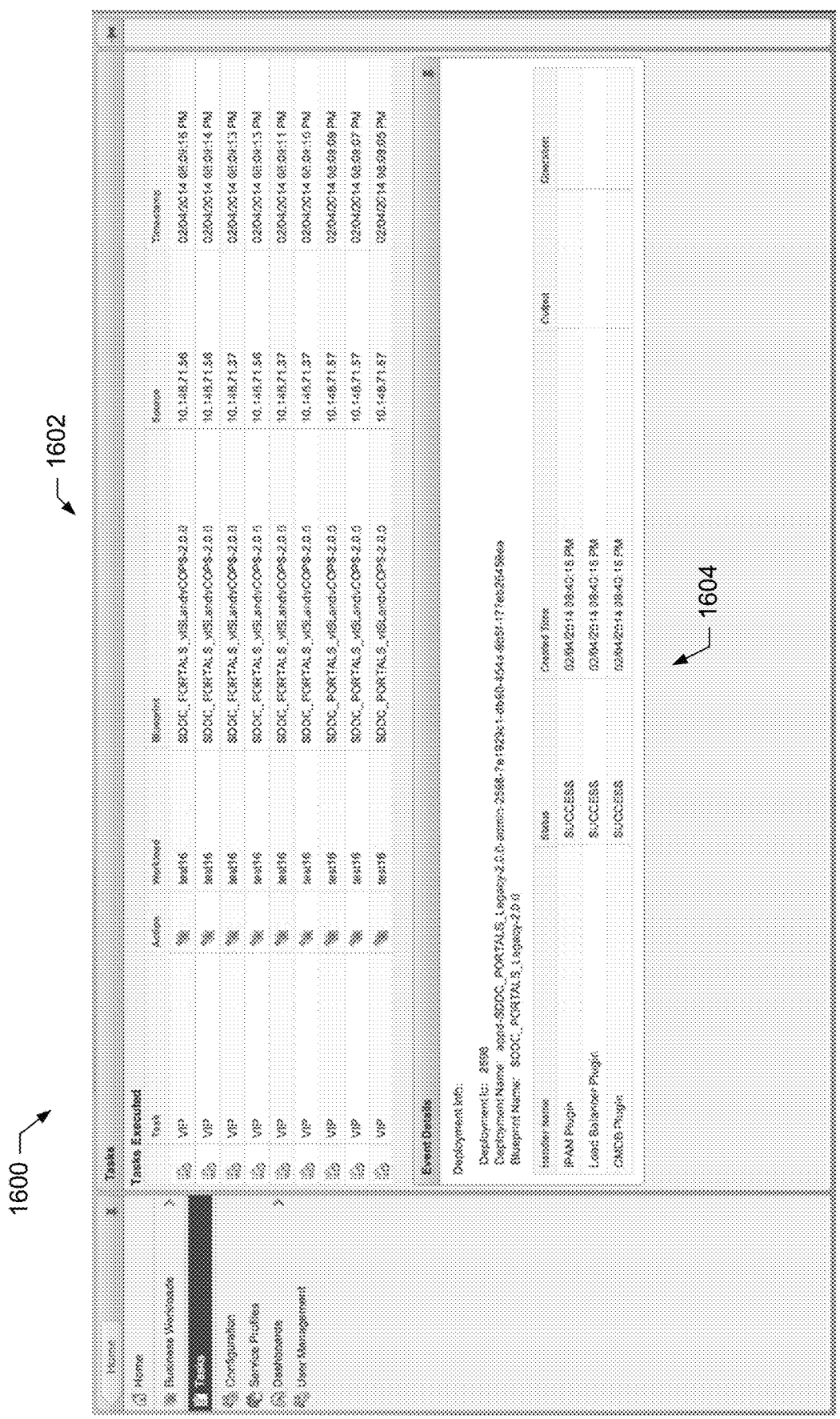

FIG. 16 is illustrates an example graphical user interface 1600 that displays information about previously executed tasks. The example graphical user interface 1600 of FIG. 16 includes a listing of information about previously executed tasks 1602. The example graphical user interface 1600 of this example also includes information about a deployment 1604 including information about the status of execution of plugins associated with the deployment.

Figure 17:
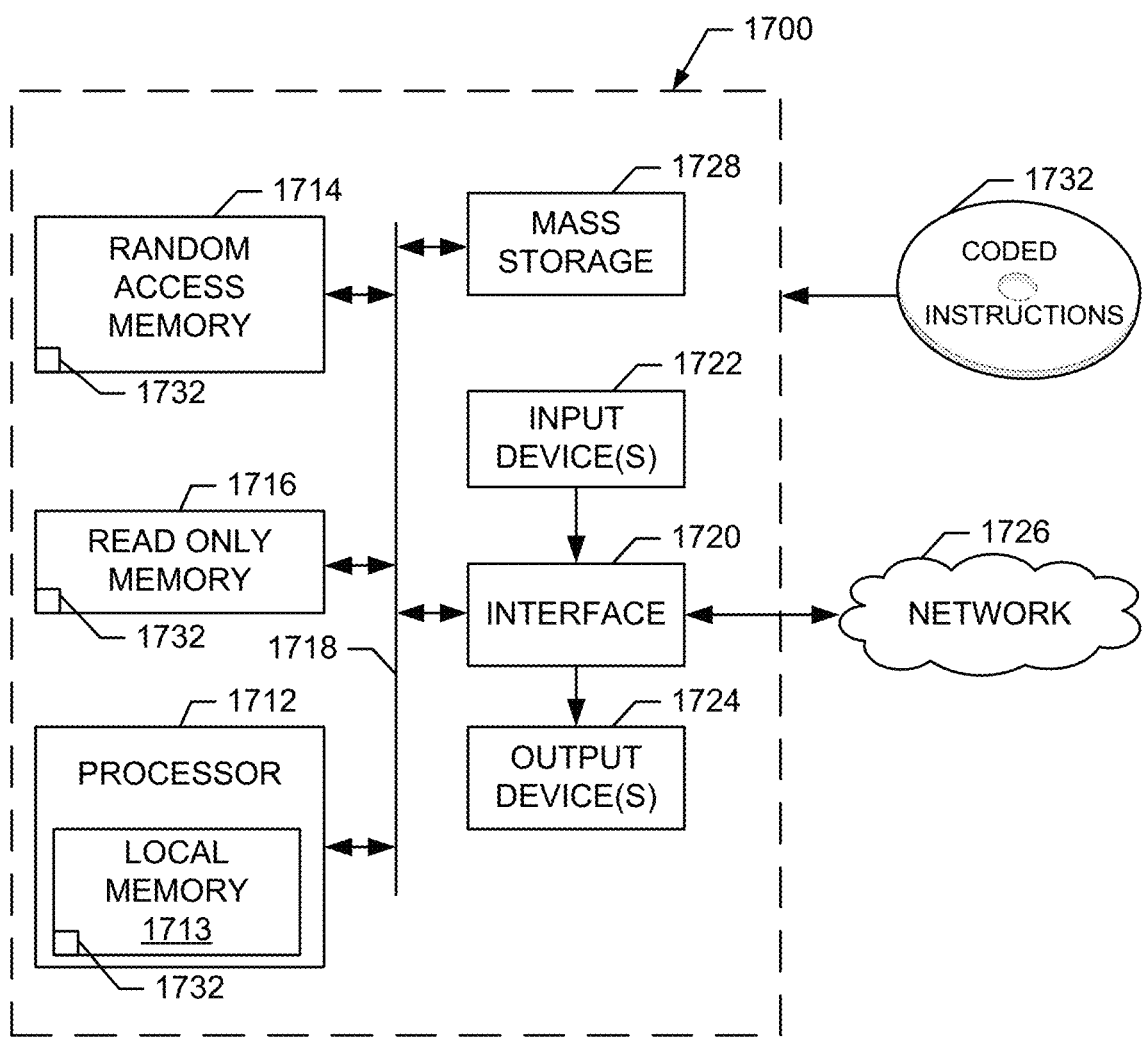
FIG. 17 is a block diagram of an example processing platform capable of executing the example machine readable instructions of FIGS. 4-9 and/or 11-12 to implement the example cloud manager of FIGS. 1, 2, 3, and/or 10.

FIG. 17 is a block diagram of an example processor platform 1700 capable of executing the instructions of FIGS. 4-9 and/or 11-12 to implement the example wait request manager 202, the example wait database manager 204, the example inventory manager 206, the example notify request manager 208, the example notify datastore manager 210 of FIG. 2, the example dependency controller 140, the example asset notice receiver 302, the example information collector 304, the example inventory interface 306, the example configuration retriever 308, the example inventory user interface generator 310 of FIG. 3 and/or the example configuration controller 144 of FIGS. 1-3 and/or the example request receiver 1002, the example profile retriever 1004, the example profile designer 1008, the example service executor 1010 of FIG. 10. The processor platform 1700 can be, for example, a server or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

The coded instructions 1732 of FIGS. 4-9 and 11-12 may be stored in the mass storage device 1728, in the volatile memory 1714, in the non-volatile memory 1716, and/or on a removable tangible computer readable storage medium such as a CD or DVD.

While several graphical user interfaces are provided as example interfaces for obtaining user input, any other type of user interface and/or control may be provided (e.g., a command line interface, text based interface, slider, text box, etc.). Additionally or alternatively, any of the methods and apparatus described herein may be accessed programmatically (e.g., using an API of the cloud manager 138 (e.g., a vCAC API)) by another program or device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    after initiation of deployment and creation of a first virtual machine in a deployment environment and copying of a first application to the first virtual machine, determining, by executing an instruction with a processor, that the deployment of the first virtual machine has halted because installation of the first application on the first virtual machine is dependent on a parameter identifying a network location of a database application of a second virtual machine that has not been fully deployed, the second virtual machine being deployed, including creation of the second virtual machine in the deployment environment, while the first virtual machine is being deployed, and the deployment of the second virtual machine including installation of a second application on the second virtual machine and continuing when the deployment of the first virtual machine is halted; and
    in response to detecting that the second virtual machine has been deployed and has stored the parameter identifying the network location of the database application in a repository, notifying, by executing an instruction with the processor, the first virtual machine of the parameter identifying the network location of the database application and indicating that deployment of the first virtual machine may continue.

2. A method as defined in claim 1, wherein the determining that the deployment of the first virtual machine has halted is based on a wait request from the first virtual machine.

3. A method as defined in claim 2, further including storing an indication of the wait request in a datastore.

4. A method as defined in claim 2, further including, in response to the wait request, querying an inventory of virtual machines for a workload identified in the wait request to identify the second virtual machine.

5. A method as defined in claim 4, wherein the detecting that the second virtual machine has been deployed includes querying a datastore for a notification received from the second virtual machine.

6. A method as defined in claim 1, wherein the detecting that the second virtual machine has been deployed includes receiving a notify request from the second virtual machine.

7. An apparatus comprising:
    a wait request manager including a logic circuit to, after initiation of deployment and creation of a first virtual machine in a deployment environment and copying of a first application to the first virtual machine, determine that the deployment of the first virtual machine has halted because installation of the first application on the first virtual machine is dependent on a parameter identifying a network location of a database application of a second virtual machine that has not been fully deployed, the second virtual machine being deployed, including creation of the second virtual machine in the deployment environment, while the first virtual machine is being deployed, and the deployment of the second virtual machine including installation of a second application on the second virtual machine and continuing when the deployment of the first virtual machine is halted; and
    a notify request manager to, in response to detecting that the second virtual machine has been deployed and has stored the parameter identifying the network location of the database application in a repository, notify the first virtual machine of the parameter identifying the network location of the database application and indicating that deployment of the first virtual machine may continue.

8. An apparatus as defined in claim 7, wherein the wait request manager is to determine that the deployment of the first virtual machine has halted based on a wait request from the first virtual machine.

9. An apparatus as defined in claim 8, further including a wait datastore manager to store an indication of the wait request in a datastore.

10. An apparatus as defined in claim 8, further including an inventory manager to, in response to information from the wait request from the wait request manager, query an inventory of virtual machines for a workload identified in the wait request to identify the second virtual machine.

11. An apparatus as defined in claim 10, further including a notify datastore manager to query a datastore for a notification received from the second virtual machine.

12. An apparatus as defined in claim 7, wherein the notify request manager is to detect that the second virtual machine has been deployed based on a notify request from the second virtual machine.

13. A tangible computer readable storage medium comprising instructions that, when executed, cause a machine to at least:

after initiation of deployment and creation of a first virtual machine in a deployment environment and copying of a first application to the first virtual machine that the deployment of the first virtual machine has halted because installation of the first application on the first virtual machine is dependent on a parameter identifying a network location of a database application of a second virtual machine that has not been fully deployed, the second virtual machine being deployed, including creation of the second virtual machine in the deployment environment, while the first virtual machine is being deployed, and the deployment of the second virtual machine including installation of a second application on the second virtual machine and continuing when the deployment of the first virtual machine is halted; and in response to detecting that the second virtual machine has been deployed and has stored the parameter identifying the network location of the database application in a repository, notify the first virtual machine of the parameter identifying the network location of the database application and indicating that deployment of the first virtual machine may continue.

14. A tangible computer readable storage medium as defined in claim 13, wherein the instructions, when executed, cause the machine to determine that the deployment of the first virtual machine has halted based on a wait request from the first virtual machine.

15. A tangible computer readable storage medium as defined in claim 14, wherein the instructions, when executed, cause the machine to store an indication of the wait request in a datastore.

16. A tangible computer readable storage medium as defined in claim 14, wherein the instructions, when executed, cause the machine to, in response to the wait request, query an inventory of virtual machines for a workload identified in the wait request to identify the second virtual machine.

17. A tangible computer readable storage medium as defined in claim 16, wherein the instructions, when executed, cause the machine to detect that the second virtual machine has been deployed by querying a datastore for a notification received from the second virtual machine.

18. A tangible computer readable storage medium as defined in claim 13, wherein the instructions, when executed, cause the machine to detect that the second virtual machine has been deployed based on a notify request from the second virtual machine.

* * * * *